(12) United States Patent
Kazuno et al.

(10) Patent No.: US 10,305,410 B2
(45) Date of Patent: May 28, 2019

(54) FUEL CELL SYSTEM CONTROL METHOD AND FUEL CELL VEHICLE

(71) Applicant: HONDA MOTOR CO., LTD., Tokyo (JP)

(72) Inventors: Shuichi Kazuno, Wako (JP); Yasushi Kojima, Wako (JP); Jiro Fujimoto, Wako (JP); Kosuke Higashitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 336 days.

(21) Appl. No.: 15/255,151

(22) Filed: Sep. 2, 2016

(65) Prior Publication Data

US 2017/0066337 A1 Mar. 9, 2017

(30) Foreign Application Priority Data

Sep. 4, 2015 (JP) .................. 2015-174461

(51) Int. Cl.
*B60L 1/00* (2006.01)
*B60L 3/00* (2019.01)
(Continued)

(52) U.S. Cl.
CPC .............. *H02P 27/06* (2013.01); *B60L 1/003* (2013.01); *B60L 7/14* (2013.01); *B60L 15/2045* (2013.01); *B60L 58/30* (2019.02); *H02M 7/44* (2013.01); *B60L 2210/14* (2013.01); *B60L 2210/42* (2013.01); *B60L 2240/12* (2013.01); *B60L 2240/14* (2013.01); *B60L 2240/421* (2013.01); *B60L 2240/427* (2013.01); *B60L 2240/526* (2013.01); *B60L 2240/527* (2013.01);
(Continued)

(58) Field of Classification Search
USPC ......................................................... 307/10.1
See application file for complete search history.

(56) References Cited

FOREIGN PATENT DOCUMENTS

JP 2007-209161 8/2007
JP 2010-273495 12/2010
(Continued)

OTHER PUBLICATIONS

Japanese Office Action for corresponding JP Application No. 2015-174461, dated Jul. 11, 2017 (w/ English machine translation).

*Primary Examiner* — Rexford N Barnie
*Assistant Examiner* — Dru Parries
(74) *Attorney, Agent, or Firm* — Mori & Ward, LLP

(57) ABSTRACT

In a control method for a fuel cell system, a fuel cell side converter that is provided between a fuel cell and an inverter is controlled to step up a fuel cell voltage to an inverter terminal voltage supplied to the inverter. A margin voltage is set to guarantee step-up operation or interruption of operation of the fuel cell side converter. A directly connected state or a voltage transforming state regarding an operation state of an energy storage device side converter is selected such that the inverter terminal voltage is higher than a sum of the margin voltage and the fuel cell voltage. The energy storage device side converter does not transform the energy storage device voltage in the directly connected state. The energy storage device side converter transforms the energy storage device voltage to the inverter terminal voltage in the voltage transforming state.

20 Claims, 15 Drawing Sheets

(51) Int. Cl.

| | |
|---|---|
| *H02P 27/06* | (2006.01) |
| *H02M 7/44* | (2006.01) |
| *B60L 7/14* | (2006.01) |
| *B60L 15/20* | (2006.01) |
| *B60L 58/30* | (2019.01) |
| *H02M 3/156* | (2006.01) |
| *H02M 7/48* | (2007.01) |
| *H02M 1/00* | (2006.01) |

(52) U.S. Cl.
CPC ..... *B60L 2240/547* (2013.01); *B60L 2240/80* (2013.01); *B60L 2260/26* (2013.01); *H02M 3/156* (2013.01); *H02M 7/48* (2013.01); *H02M 2001/007* (2013.01); *H02M 2001/0054* (2013.01); *Y02T 10/645* (2013.01); *Y02T 10/7225* (2013.01); *Y02T 10/7283* (2013.01); *Y02T 10/92* (2013.01); *Y02T 90/34* (2013.01)

(56) References Cited

FOREIGN PATENT DOCUMENTS

| | | | |
|---|---|---|---|
| JP | 2010273495 A | * | 12/2010 |
| JP | 2013-016335 | | 1/2013 |
| JP | 2014-014216 | | 1/2014 |
| JP | 2014-166103 | | 9/2014 |

* cited by examiner

FUEL CELL SYSTEM CONTROL METHOD AND FUEL CELL VEHICLE

CROSS-REFERENCE TO RELATED APPLICATIONS

The present application claims priority under 35 U.S.C. § 119 to Japanese Patent Application No. 2015-174461, filed Sep. 4, 2015, entitled "Fuel Cell System Control Method and Fuel Cell Vehicle." The contents of this application are incorporated herein by reference in their entirety.

BACKGROUND

1. Field

The present disclosure relates to a control method for a fuel cell system, and a fuel cell vehicle.

2. Description of the Related Art

Japanese Unexamined Patent Application Publication No. 2014-166103 discloses this type of fuel cell system. Japanese Unexamined Patent Application Publication No. 2014-166103 discloses a fuel cell system that stops step-up operation of a fuel cell side converter when load of a motor (inverter and motor) is in a low load state (paragraphs [0009] and [0010] of Japanese Unexamined Patent Application Publication No. 2014-166103).

Due to stopping step-up operation of the fuel cell side converter, the fuel cell voltage is applied directly to the inverter through a diode or the like, and a directly connected state is formed between the fuel cell and the motor load.

Thus by stopping step-up operation of the fuel cell side converter and making a direct connection, the switching loss of the fuel cell side converter becomes a value of zero. The efficiency of the fuel cell system is accordingly improved. In cases in which the fuel cell system is a fuel cell vehicle, what is referred to as fuel efficiency, or in other words the driving range per liter of hydrogen under standard driving conditions and standard hydrogen pressure filling, is improved.

In such cases, the fuel cell voltage can be controlled by an energy storage device side converter having a function to step-up the energy storage device voltage.

SUMMARY

According to one aspect of the present invention, in a control method for a fuel cell system, an inverter is controlled to transform a fuel cell voltage generated by a fuel cell and an energy storage device voltage generated by an energy storage device to supply power to a motor. A fuel cell side converter that is provided between the fuel cell and the inverter is controlled to step up the fuel cell voltage to an inverter terminal voltage supplied to the inverter. A margin voltage is set to guarantee step-up operation or interruption of operation of the fuel cell side converter. A directly connected state or a voltage transforming state regarding an operation state of an energy storage device side converter is selected such that the inverter terminal voltage is higher than a sum of the margin voltage and the fuel cell voltage. The energy storage device side converter is provided between the energy storage device and the inverter. The energy storage device side converter does not transform the energy storage device voltage in the directly connected state. The energy storage device side converter transforms the energy storage device voltage to the inverter terminal voltage in the voltage transforming state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
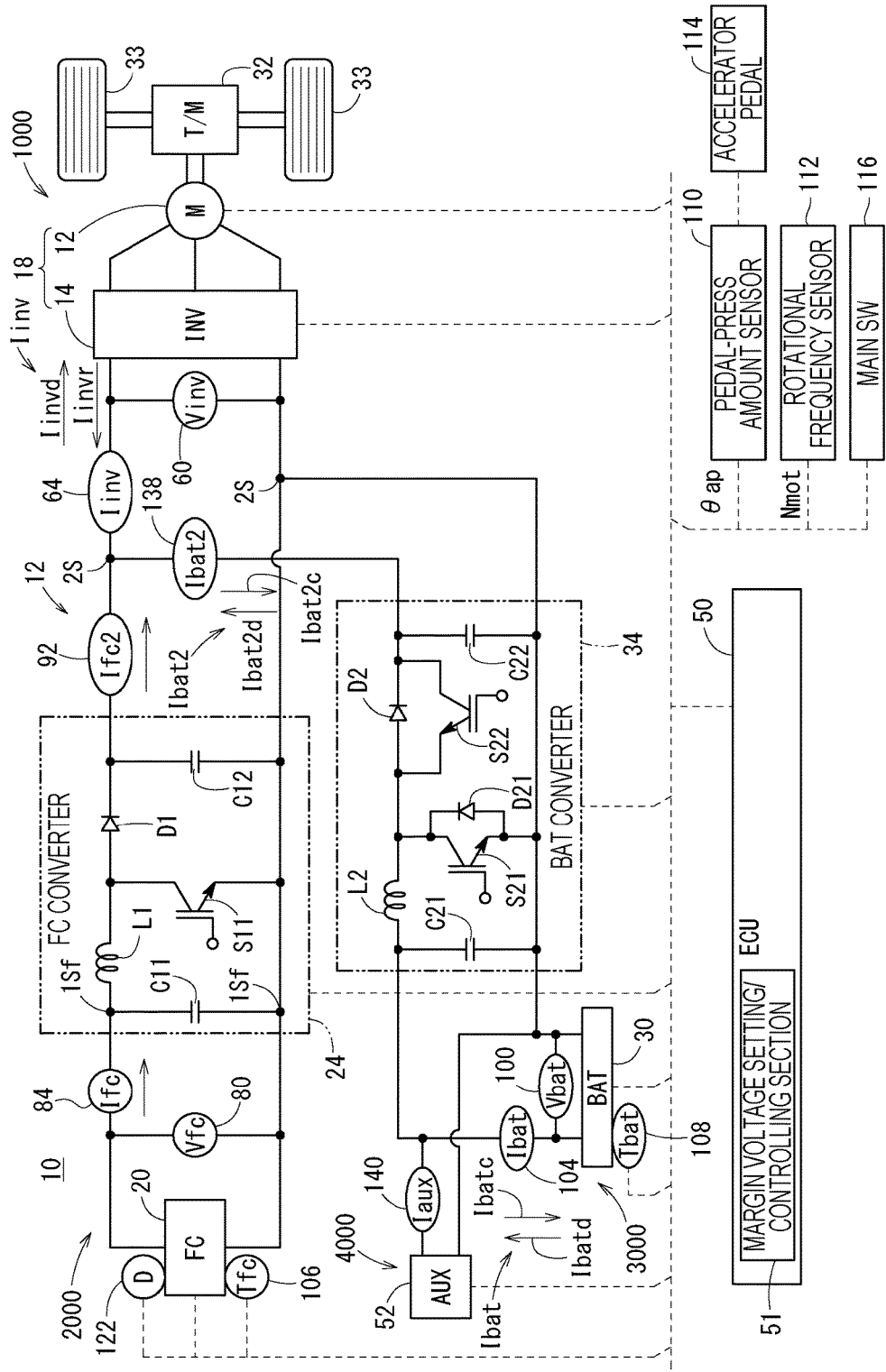
FIG. 1 is a schematic diagram of an overall configuration of a fuel cell vehicle that implements a control method of a fuel cell system according to an embodiment of the present disclosure.

The embodiments will now be described with reference to the accompanying drawings, wherein like reference numerals designate corresponding or identical elements throughout the various drawings.

Explanation follows regarding preferable embodiments of a fuel cell system control method according to the present disclosure, in relation to a fuel cell vehicle implementing the fuel cell system control method, with reference to the appended drawings.

Explanation of Configuration According to Fuel Cell Vehicle Control Method

FIG. 1 is a schematic configuration diagram illustrating a fuel cell vehicle 10 according to the present embodiment (also sometimes referred to below as "FC vehicle 10" or "vehicle 10").

Note that a fuel cell system is called FC vehicle 10 when a main load of the fuel cell system is a traction motor 12. The fuel cell system control method according to the present embodiment may be applied to, for example, a plant in a factory facility where the load is a motor other than a traction motor.

As illustrated in FIG. 1, the FC vehicle 10 includes a drive system 1000, a fuel cell system (also sometimes referred to below as a "FC system") 2000, a battery system 3000, an auxiliary equipment system 4000, and an electronic control unit 50 (also sometimes referred to below as "ECU 50") to control these configuration elements. In order to avoid complications, some of the lines (such as signal lines) from the ECU 50 to each of the configuration elements are omitted from illustration in FIG. 1.

The fuel cell system 2000 and the battery system 3000 basically function as parallel power sources of the overall fuel cell vehicle 10. The drive system 1000 and the auxiliary equipment system 4000 basically function as loads consuming power supplied from the power sources (the fuel cell system 2000 and the battery system 3000).

The drive system 1000 includes the motor 12, and an inverter 14, serving as a load drive section (motor drive section). The motor 12 and the inverter 14 are collectively referred to as a load 18 (also sometimes referred to below as main load 18).

The FC system 2000 includes a fuel cell stack 20 (referred to below as "FC 20") that is a power source, a fuel cell side converter 24 (referred to below as "FC converter 24"), and, not illustrated in the drawings, a fuel gas supply source such as a fuel tank, and an oxidizing gas supply source such as an air pump. Part of the fuel gas supply source and the oxidizing gas supply source configure part of auxiliary equipment 52 (AUX).

The FC converter 24 is a chopper step-up converter (step-up voltage transformer). The FC converter 24 includes, for example, as illustrated in the drawings, a choke coil (inductor) L1, a diode D1, a switching element (transistor) S11, and smoothing capacitors C11, C12.

The battery system 3000 includes a battery (also sometimes referred to below as "BAT") 30 serving as a high voltage energy storage device, and an energy storage device side converter 34 (also sometimes referred to below as "battery converter 34" or "BAT converter 34").

The BAT converter 34 is a chopper step-up/step-down converter (step-up/step-down voltage transformer). The BAT converter 34 includes, for example, as illustrated in the drawings, a choke coil (inductor) L2, diodes D2, D21, switching elements (transistors) S21, S22, and smoothing capacitors C21, C22.

The auxiliary equipment system 4000 is split into a high voltage system and a low voltage system, and includes the auxiliary equipment 52. The auxiliary equipment 52 includes the air pump, serving as the oxidizing gas supply source for the FC 20 of the high voltage system, an air conditioner for use in air conditioning (including a heater core for use in heating), a water pump or the like for use in cooling the FC 20, a step-down DC/DC converter for use in low voltage generation in the low voltage system, a low voltage energy storage device (low voltage battery), ignition equipment, and the like, none of which are illustrated in the drawings. The ECU 50 is also included as low voltage system auxiliary equipment in the auxiliary system 4000.

The motor 12 generates drive motive force as motive force for traction when the drive system 1000 is driven as the load 18 by power supplied in parallel from the FC 20 and the battery 30. Wheels 33 are rotationally driven by this drive motive force through a transmission 32, and the FC vehicle 10 drives.

The inverter 14 is, for example, configured as a three phase full-bridge inverter, and is a DC/AC transformer capable of two-way operation. During powered travel of the FC vehicle 10 when the motor 12 is being driven by power from the FC 20 and/or from the battery 30, the inverter 14 converts an inverter terminal voltage (load terminal voltage) Vinv, which is a direct current voltage generated at the input terminal of the inverter 14 due to the power of the FC 20 and/or the power of the battery 30 through the FC converter 24 and/or the BAT converter 34, and an inverter terminal current Iinv (driving current Iinvd), into a three phase alternating current voltage and alternating current that are then applied to the motor 12.

During power regeneration of the FC vehicle 10 (during deceleration when a pedal-press amount (accelerator pedal open angle) θap detected by a pedal-press amount sensor 110 of an accelerator pedal 114 is a value of zero, referred to as the accelerator pedal 114 being released), the inverter 14 converts alternating current regeneration power Preg (see FIG. 4B) generated by the motor 12 into direct current inverter terminal voltage Vinv and inverter terminal current Iinv (a regenerated current Iinvr). The battery 30 is charged, through the BAT converter 34, by the regeneration power Preg generated in regeneration performed by the motor 12.

The inverter terminal voltage Vinv, which is a voltage that is common to the FC converter 24 and the BAT converter 34 at the secondary side 2S (secondary side voltage), is detected by a voltage sensor 60, and is output through a signal line (not illustrated in the drawings) to the ECU 50. The inverter terminal current Iinv, which is an input terminal current of the inverter 14, is detected by a current sensor 64, and the detected value is output through a signal line (not illustrated in the drawings) to the ECU 50.

The ECU 50 includes an input/output device, a computation device (including a CPU) and a storage device, none of which are illustrated in the drawings. The ECU 50 may, for example, be split up into a drive system 1000 ECU, a FC system 2000 ECU, a battery system 3000 ECU, an auxiliary equipment system 4000 ECU, an ECU for driving the FC converter 24, an ECU for driving the BAT converter 34, and a management ECU (in a configuration in which the ECUs are capable of communicating with each other).

The FC 20 has, for example, a structure in which stacked battery fuel cells formed by a solid polymer electrolyte membrane sandwiched between an anode electrode on one side and a cathode electrode on the other. The periphery of the FC 20 includes an anode system including the fuel gas supply source, a cathode system including the oxidizing gas supply source, as well as a cooling system and the like. The anode system feeds hydrogen (fuel gas) to and from the anode of the FC 20. The cathode system feeds air containing oxygen (oxidizing gas) to and from the cathode of the FC 20. The cooling system cools the FC 20.

The FC converter 24 is disposed between the FC 20 and the inverter 14. The primary side 1Sf side of the FC converter 24 is connected to the FC 20, and the secondary side 2S side of the FC converter 24 is connected to the motor 12 through the inverter 14, and is also connected to the battery 30 and the auxiliary equipment 52 through the BAT converter 34.

The FC converter 24 steps up the fuel cell voltage Vfc (referred to below as FC voltage Vfc), which is the output voltage of the FC 20 (by duty control through ON/OFF switching of a switching element S11 (repeated ON and OFF switching)), and applies the stepped-up voltage as inverter terminal voltage Vinv at the secondary side 2S, namely at the inverter 14 side, which configures the drive system 1000.

The battery 30 is an energy storage device (energy storage) including plural battery cells, and may, for example, employ lithium ion secondary batteries, nickel hydride secondary batteries, or the like. Lithium ion secondary batteries are employed in the present embodiment. An energy storage device such as a capacitor may also be employed instead of the battery 30.

A battery voltage Vbat (V), which is the input/output terminal voltage of the battery 30, is detected by a voltage sensor 100, and the detected value is output to the ECU 50 through a signal line (not illustrated in the drawings).

A battery current Ibat (A) of the battery 30 (discharge current Ibatd or charge current Ibatc) is detected by a current sensor 104, and the detected value is output to the ECU 50 through a signal line (not illustrated in the drawings). A temperature of the battery 30 (battery temperature) Tbat (° C.) is detected by a temperature sensor 108, and the detected value is output to the ECU 50 through a signal line.

Based on the battery temperature Tbat, the battery voltage Vbat, and the battery current Ibat, the ECU 50 computes a residual capacity (%) of the battery 30 (also sometimes referred to below as "SOC" or "battery SOC"), which it then uses to manage the battery 30.

The BAT converter 34 is disposed between the battery 30 and the inverter 14. One side of the BAT converter 34 is connected to the battery 30 at the primary side 1Sb, and the other side of the BAT converter 34 is connected to the secondary side 2S, which are the connection points between the FC 20 side and the inverter 14.

The BAT converter 34 steps up the output voltage of the battery 30 (battery voltage Vbat), which is the voltage at the primary side 1Sb (primary side voltage), and supplies the stepped-up voltage to the inverter 14. The BAT converter 34 also steps down the regeneration voltage of the motor 12 (also sometimes referred to below as "regeneration voltage Vreg" (where Vinv=Vreg)) or a secondary side voltage of the FC converter 24 generated by the FC 20 (inverter terminal voltage Vinv, which is a voltage obtained by stepping up Vfc), and supplies the stepped-up voltage to the battery 30.

The secondary side voltage of the BAT converter 34 is detected by the voltage sensor 60 as the inverter voltage Vinv. A secondary side current Ibat2 of the BAT converter 34 (a discharge direction current Ibat2d, or a charge direction current Ibat2c) is detected by a current sensor 138 and the detected value is output to the ECU 50 through a signal line (not illustrated in the drawings).

From the perspectives of cost etc., the battery 30 and the FC 20 installed in the fuel cell vehicle 10 according to the present embodiment are such that a battery voltage Vbat of the battery 30 is a larger value than the FC open circuit voltage VfcOCV of the FC 20 (Vbat>VfcOCV) when in a driving state.

Figure 2:
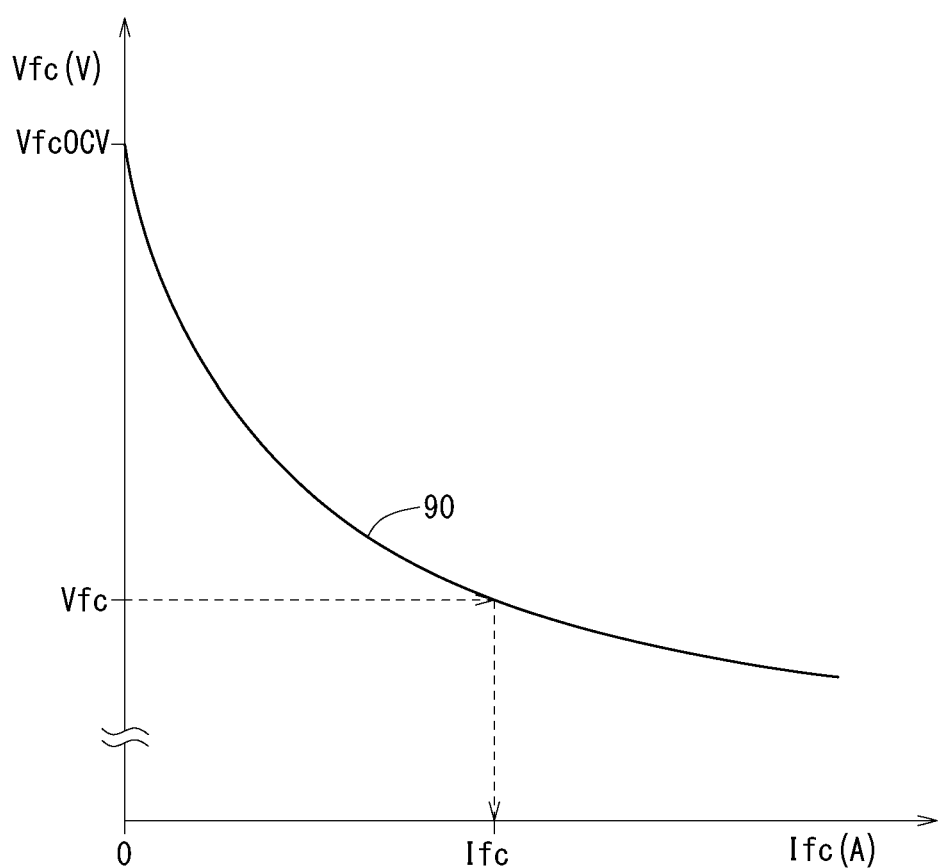
FIG. 2 is a graph of an IV characteristic of a fuel cell.

FIG. 2 illustrates an current-voltage (IV) characteristic 90 of the FC 20. In the illustrated normal-usage region of the IV characteristic 90, the FC current Ifc increases as the FC voltage Vfc falls below the FC open circuit voltage VfcOCV. More specifically, the IV characteristic is such that when the FC current Ifc is being drawn from the FC 20, the FC voltage Vfc falls from the open circuit voltage (referred to below as the FC open circuit voltage VfcOCV) with a comparatively steep slope, then when the FC current Ifc is being drawn the FC voltage Vfc falls with a gentle slope.

Moreover, as is apparent from the IV characteristic 90, the IV characteristic is such that in the normal-usage region of the FC 20, the FC power Pfc is greater the larger the FC current Ifc (the smaller the FC voltage Vfc).

Then, for example, if the FC voltage Vfc, which is the primary side voltage of the FC converter 24, is an instructed voltage (the target voltage), then the step-up ratio of the FC converter 24 (Vinv/Vfc) is determined so as to achieve this instructed voltage, and the FC current Ifc flows out from the FC 20 according to the IV characteristic 90 corresponding to the FC voltage Vfc when the actual voltage has reached the instructed voltage. However, if the FC current Ifc is an instructed current (target current), then the FC voltage Vfc is determined so as to achieve the instructed current, the step-up ratio of the FC converter 24 (Vinv/Vfc) is determined so as to achieve this FC voltage Vfc, and the FC voltage Vfc is generated at the FC 20 terminal according to the IV characteristic 90 corresponding to the FC current Ifc where the actual current has reached the instructed current.

When the FC voltage Vfc, which is the voltage at the primary side 1Sf of the FC converter 24, is being stepped up by the FC converter 24, Vfc<Vinv, and the FC voltage Vfc becomes lower than the inverter terminal voltage Vinv. The FC vehicle 10 of the present embodiment is configured such that when the FC converter 24 is stopped (when the switching element S11 is OFF) such as at an idling stop, even, for example, in cases in which the BAT converter 34 is in a directly connected state, the switching loss of the FC converter 24 is a value of zero since the inverter terminal voltage Vinv (in this case the battery voltage Vbat∞Vinv) is controlled so as to become greater than the FC open circuit voltage VfcOCV. The overall system efficiency of the FC vehicle 10 is thereby increased. Note that when the FC converter 24 has been placed in a stopped state and a state in which VfcOCV<Vinv has been adopted, the diode D1 of the FC converter 24 adopts a reverse biased state, and the FC current Ifc does not flow out from the FC 20, and so this is referred to as a power cuttoff (power interrupt) state of the FC 20.

The FC voltage Vfc, which is the voltage of the primary side 1Sf of the FC converter 24, is detected by a voltage sensor 80 and the detected value is output to the ECU 50 through a signal line (not illustrated in the drawings). The FC current Ifc, which is the current at the primary side 1Sb of the FC converter 24, is detected by a current sensor 84, and the detected value is output to the ECU 50 through a signal line (not illustrated in the drawings). The voltage of the secondary side 2S of the FC converter 24 is detected by the voltage sensor 60 as the inverter terminal voltage Vinv. The current Ifcinv of the secondary side 2S of the FC converter 24 is detected by a current sensor 92 and the detected value is output to the ECU 50 through a signal line (not illustrated in the drawings). The temperature of the FC 20 (FC temperature) Tfc (° C.) is detected by a temperature sensor 106, and the detected value is output to the ECU 50 through a signal line.

When the BAT converter 34 is directly connected (when in a directly connected state), a switching element S21 is placed in an OFF state, and a diode D2 is placed in an ON state during powered travel, and a switching element S22 is placed in an ON state during power regeneration. The inverter terminal voltage Vinv accordingly becomes the battery voltage Vbat (Vinv≈Vbat) when the BAT converter 34 is directly connected. More precisely, during powered travel, Vinv=Vbat−Vd2 (where Vd2 is a step-down voltage in the forward direction of the diode D2), and during power regeneration, Vbat=Vinv−Von22 (where Von22 is the ON voltage of the switching element 22). Since in both cases the switching loss of the BAT converter 34 is a value of zero during direct connection of the BAT converter 34, the overall system efficiency of the FC vehicle 10 is increased, and fuel efficiency is improved.

An auxiliary equipment current Iaux flowing in the auxiliary equipment 52 is detected by a current sensor 140 and the detected value is output to the ECU 50 through a signal line (not illustrated in the drawings).

The ECU 50 controls the motor 12, the inverter 14, the FC 20, the battery 30, the FC converter 24, and the BAT converter 34. In order to perform such control, the ECU 50 executes a program stored in a storage device, not illustrated in the drawings. The ECU 50 employs detection values of various sensors, such as the voltage sensors 60, 80, and 100, and the current sensors 64, 84, 104, 138, and 140.

In addition to the pedal-press amount sensor 110 mentioned above, the various sensors include a motor rotational frequency sensor 112 and a wheel speed sensor (not illustrated in the drawings). The motor rotational frequency sensor 112 detects the rotational frequency Nmot (rpm) of the motor 12. The ECU 50 employs the rotational frequency Nmot to detect the vehicle speed Vs (km/h) of the vehicle 10. The wheel speed sensor 112 detects the speed (wheel speed) of each of the wheels, not illustrated in the drawings.

Based on the state of the FC 20, the state of the battery 30, the state of the motor 12, and the state of the auxiliary equipment 52, and also on the input from the various switches and various sensors (the load requirement), the ECU 50 computes a system power requirement Psysreq (kW), which is a system load (overall load) required by the FC vehicle 10 overall.

The ECU 50 then, from the system power requirement Psysreq, determines an FC power requirement Pfcreq, which is a load that should be borne by the FC 20 (FC load), and a battery power requirement Pbatreq, which is a load that should be borne by the battery 30 (battery load), while adjusting a distribution (allocation) of regeneration power Preg, which is a load (regeneration load) which should be borne by the regeneration power source (the motor 12).

Moreover, a margin voltage Vmar is set in the present embodiment by a margin voltage setting/controlling section 51 of the ECU 50 such that the ECU 50 does not lose ability to control the FC 20 when the FC converter 24 adopts a directly connected state, namely, such that the FC converter 24 can be constantly maintained in the step-up state (except for during deliberate interruption of the FC converter 24), and such that the inverter terminal voltage Vinv does not fall beneath a voltage of the margin voltage Vmar added to the FC voltage Vfc (Vfc+Vmar), namely, such that Vinv<Vfc+Vmar does not occur.

The margin voltage Vmar is set such that the following Equation (1) is satisfied:

$$Vmar \geq Vinv - Vfc \quad (1)$$

The margin voltage Vmar is preferably set to a minimum voltage (lower limit margin voltage) in a range capable of constantly maintaining the FC converter 24 in the step-up state, from the perspective of contributing to improvements in fuel efficiency while also securing an improvement in the controllability of the FC vehicle 10.

In order to achieve this, the present embodiment basically sets, as the margin voltage Vmar, a first margin voltage Vmar1, which is a lower limit margin voltage when the BAT converter 34 is directly connected, and a second margin voltage Vmar2, which is a lower limit margin voltage when the BAT converter 34 is stepping up or stepping down voltage, and which is the first margin voltage Vmar1 summed with a specific voltage.

The first margin voltage Vmar1 is set according to load requirements etc. as a minimum value (lower limit value) in consideration of a minimum amount of leeway in voltage such that the FC converter 24 is not placed in the directly connected state by a difference voltage (direct connection inverter-to-FC difference voltage) ΔVif between inverter terminal voltage Vinv (in this case Vinv≈Vbat) and the FC voltage Vfc when the BAT converter 34 adopts a directly connected state (ΔVif=Vbat−Vfc).

The second margin voltage Vmar2 is set, according to load requirements etc., as a minimum value (lower limit value) in consideration of the minimum amount of leeway in voltage such that the FC converter 24 is not placed in the directly connected state due to a bottom peak value of a ripple voltage in the inverter terminal voltage Vinv according to the step-up/step-down operation of the BAT converter 34 in cases in which the BAT converter 34 is in a step-up state or a step-down state.

Namely, the second margin voltage Vmar2 is set to a voltage of the first margin voltage Vmar1 summed with a ripple voltage during a step-up/step-down state of the BAT converter 34.

In other words, the second margin voltage Vmar2 is set such that the difference voltage (step-up/step-down battery-to-FC difference voltage) ΔVbf (ΔVbf=|Vbat−Vfc|), between the battery voltage Vbat and the FC voltage Vfc required to maintain the step-up/step-down state of the BAT converter 34, is a minimum value (lower limit value) required so as not to generate a directly connected state of the BAT converter 34.

Figure 10:
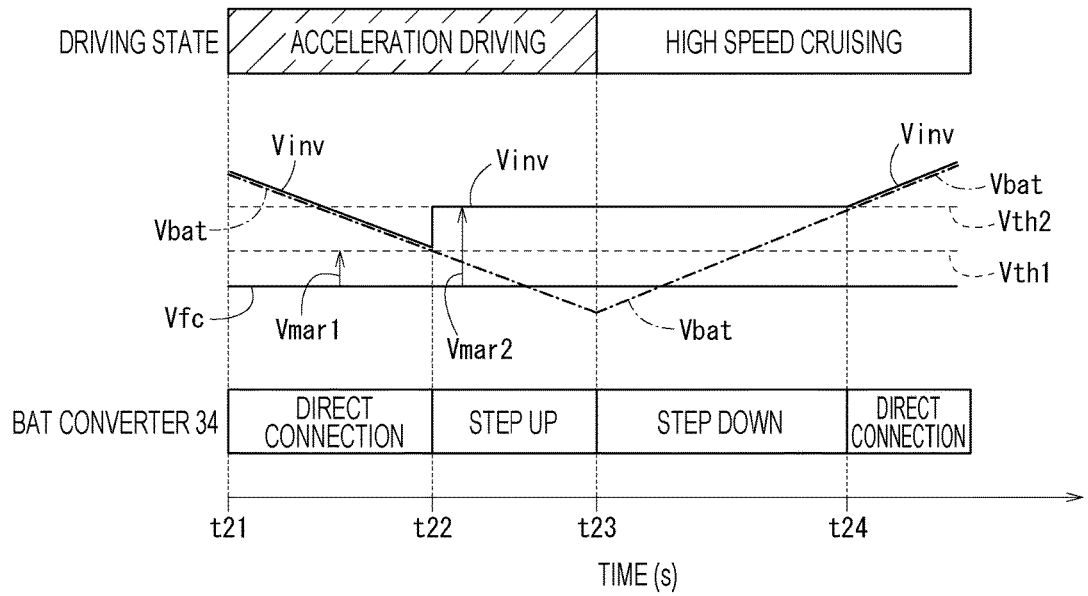
FIG. 10 is a timing chart to accompany explanation of resolution by an embodiment of the first issue.

In practice, during direct connection of the BAT converter 34 (Vinv≈Vbat), when, for example, the load requirement has become large and the inverter-to-FC voltage difference ΔVif (ΔVif=Vbat−Vfc) has decreased to the first margin voltage Vmar1, so that the FC converter 24 does not adopt a directly connected state, the inverter-to-FC voltage difference ΔVif is switched by the ECU 50 to the second margin voltage Vmar2, and the BAT converter 34 is controlled to the step-up state (voltage conversion state) (for example, at time t22 of FIG. 10, explained below).

However, when, for example, the battery voltage Vbat has risen during voltage step-down (when the state-down state is continuing) of the BAT converter 34, and the battery-to-FC voltage difference ΔVbf (ΔVbf=|Vbat−Vfc|, where ‖ indicates the absolute value) has increased to the second margin voltage Vmar2, determination is made that a voltage step-up state of the FC converter 24 has been sufficiently secured, and, in order to improve fuel efficiency, control is therefore performed by the ECU 50 place the BAT converter 34 in the directly connected state (for example, at time t24 of FIG. 10, explained below).

In the present embodiment, the first margin voltage Vmar1 is set to a voltage of a margin voltage component that considers the margin of error in the voltage sensors 80, 100, to which a pre-measured ripple voltage component (referred to as a FC converter ripple voltage component Vfcconvrpl), which has been measured for the inverter terminal voltage Vinv caused by the FC converter 24, has been added.

In the present embodiment, the second margin voltage Vmar2 is set to a voltage of a margin voltage component that considers the margin of error in the voltage sensors 80, 100, to which a ripple voltage component of the inverter terminal voltage Vinv caused by the FC converter 24, and a ripple voltage component of the inverter terminal voltage Vinv caused by the BAT converter 34 (referred to as a BAT converter ripple voltage component Vbatconvrpl), have been added. Namely, the second margin voltage Vmar2 is set to a voltage of the first margin voltage Vmar1 summed with the BAT converter ripple voltage component Vbatconvrpl, which is a ripple voltage component pre-measured for the inverter terminal voltage Vinv caused by the BAT converter 34.

As described below, the margin voltage Vmar (the first margin voltage Vmar1 and/or the second margin voltage Vmar2) is configured so as to be variable according to the driving state (such as driving while accelerating or decelerating, driving while regenerating under deceleration, and driving under cruise control) and the state of the battery 30 (SOC and temperature, deterioration with time), or the state of the auxiliary equipment 52.

Explanation of Processing According to the Fuel Cell Vehicle Control Method

Figure 3:
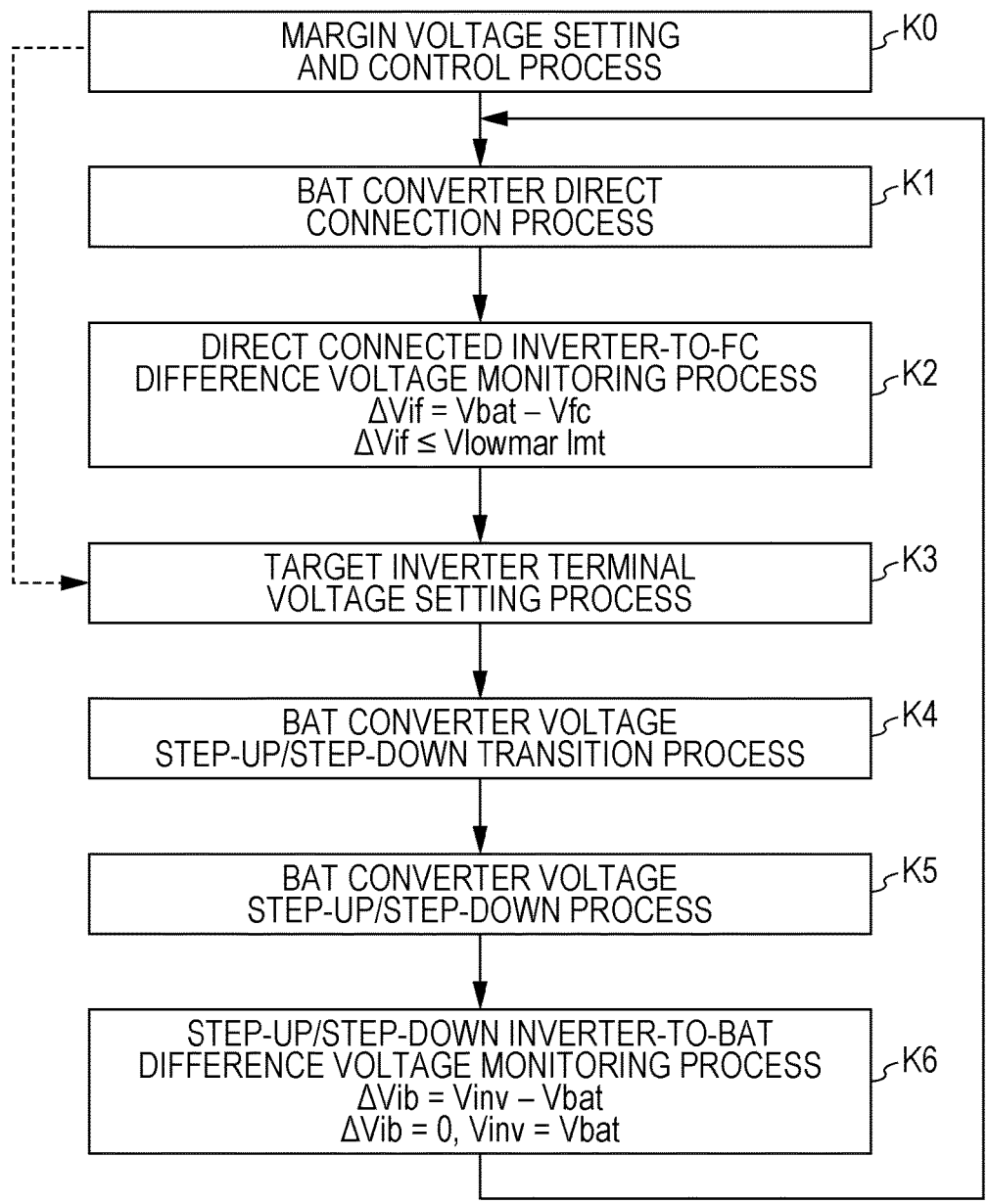
FIG. 3 is a process diagram related to a control method of a fuel cell system according to an embodiment of the present disclosure.

Explanation follows regarding processing according to the control method of the FC vehicle 10, with reference to the process diagram of FIG. 3.

First, in a margin voltage setting and control process K0, when a main switch 116 of the FC vehicle 10 is switched from the OFF state to the ON state, the margin voltage Vmar is set to a default value. The margin voltage setting and control process K0 is implemented when a target inverter terminal voltage setting process K3, described later, is performed, and also at other appropriate times.

Next, in order to stop the BAT converter 34 as much as possible in order to improve fuel efficiency in the FC vehicle 10, the ECU 50 controls to place the switching element S21 configuring the BAT converter 34 in an OFF state, and to place the switching element S22 in the ON state, such that the battery 30 and the inverter 14 adopt a directly connected state (this is a process to directly connect the BAT converter 34, and so is referred to as a BAT converter direct connection process K1).

In the BAT converter direct connection process K1, in order to secure the controllability of the FC 20, the FC voltage Vfc is feedback-controlled by the FC converter 24 in a step-up state. In the step-up state of the FC converter 24, the switching state of the switching element S11 is ON/OFF controlled by the ECU 50.

Figure 4A:
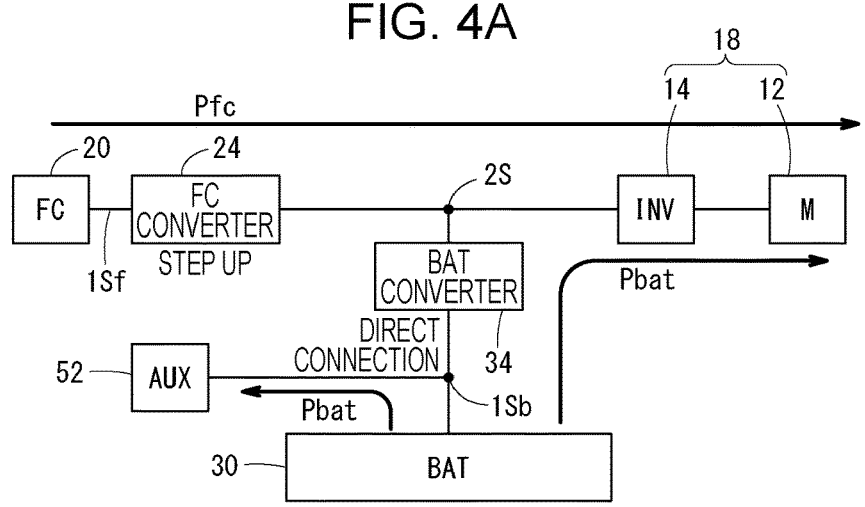
FIG. 4A is a block diagram illustrating a flow of power during low speed cruising, or driving with gentle acceleration, with an energy storage device side converter is in a directly connected state.

As illustrated in FIG. 4A, the BAT converter direct connection process K1 is, for example, applied during low speed cruising (when driving at a constant low speed) or during driving with gentle acceleration (light acceleration) when there is comparatively low load when driving the FC vehicle 10. As indicated by the arrows, the FC power Pfc is supplied for power driving to the load 18 (to the motor 12 through the inverter 14) through the FC converter 24 in the step-up state. At the same time, battery power Pbat is supplied for power driving to the load 18 through the BAT converter 34 (through the diode D2 thereof) in the directly connected state. The battery power Pbat is also supplied to the auxiliary equipment 52.

Note that low speed means a vehicle speed generally not exceeding 40 km/h to 70 km/h (depending on vehicle type).

Figure 4B:
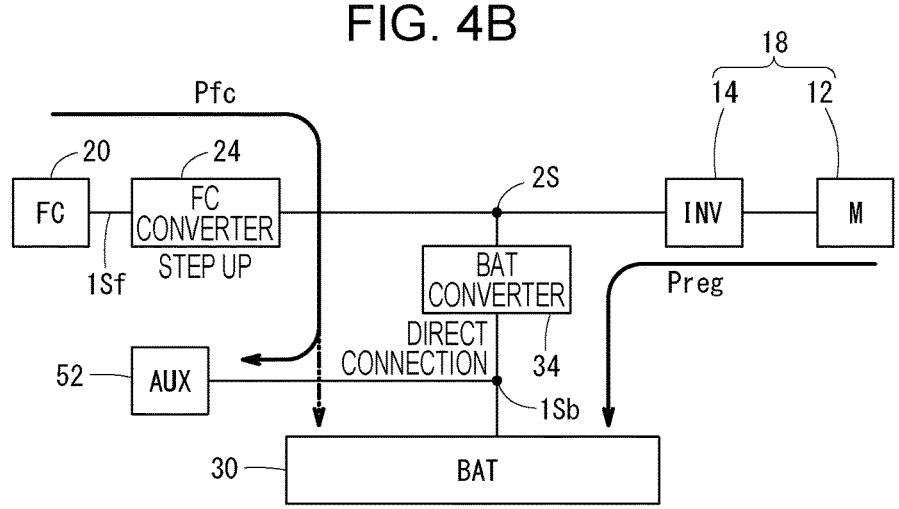
FIG. 4B is a block diagram illustrating a flow of power during regeneration driving while decelerating, with an energy storage device side converter in a directly connected state.

As illustrated in FIG. 4B, the BAT converter direct connection process K1 is also applied, for example, during regeneration driving while decelerating the FC vehicle 10 (driving while decelerating in a state in which the pedal-press amount θap=0, a released state (non-pressed state) of the accelerator pedal 114). As indicated by the arrows, a comparatively large regeneration power Preg generated by the motor 12 is supplied to the battery 30 as charging power, through the inverter 14 and the directly connected state BAT converter 34 (through the switching element S22 thereof that has been placed in an ON state). At the same time, the FC power Pfc is supplied to the auxiliary equipment 52, through the FC converter 24 in step-up state, and through the BAT converter 34 in the directly connected state (through the switching element S22 thereof that has been placed in an ON state). Moreover, when there is excess FC power Pfc remaining, this is supplied as charging power to the battery 30, as indicated by the double dotted arrow.

Figure 4C:
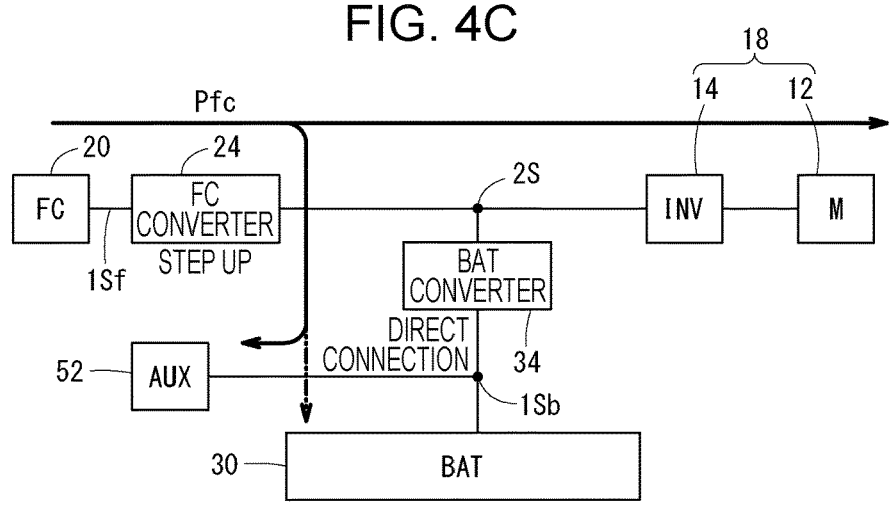
FIG. 4C is a block diagram illustrating a flow of power during driving while decelerating, with the energy storage device side converter in a directly connected state.

As illustrated in FIG. 4C, the directly connected state of the BAT converter 34 is also maintained during driving while decelerating (when the pedal-press amount of the accelerator pedal 114 θap is decreasing (θap≠0)) that is not regeneration driving while decelerating (when the pedal-press amount θap of the accelerator pedal 114 is a value of zero). The regeneration power Preg (FIG. 4B) becomes a value of zero at this time. During such deceleration driving, as indicated by the arrows, the FC power Pfc is supplied to the motor 12, the auxiliary equipment 52, and, when there is excess remaining thereof, to the battery 30.

Figure 5A:
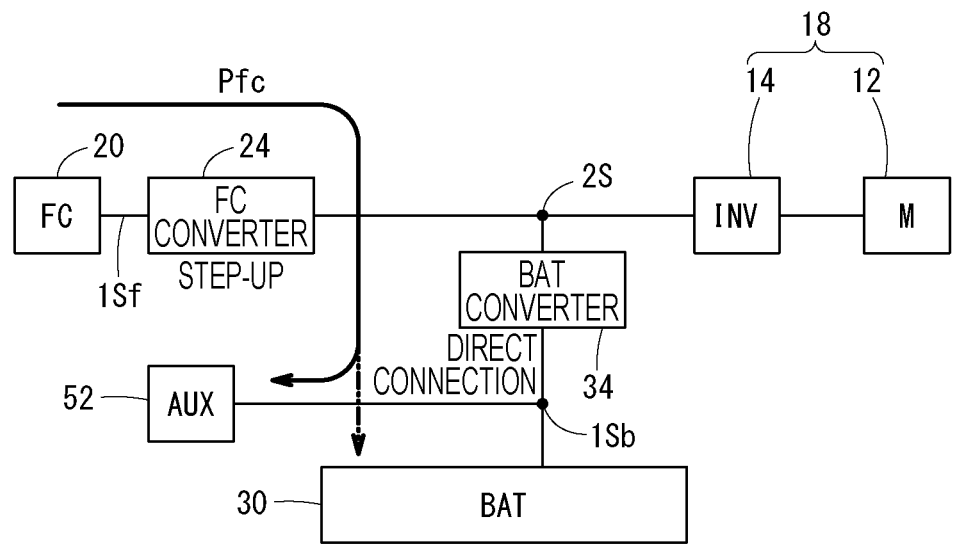
FIG. 5A is a block diagram illustrating a flow of power during idling stop, with an energy storage device side converter in a directly connected state.

As illustrated in FIG. 5A, the directly connected state of the BAT converter 34 is also maintained when the FC vehicle 10 is in an idling stop, and, as indicated by the arrows, the FC power Pfc is supplied to the auxiliary equipment 52, and, when there is excess remaining thereof, to the battery 30.

In this manner, when driving or stationary in the directly connected state of the BAT converter 34, the switching loss of the BAT converter 34 is a value of zero, converter loss (power loss) is greatly reduced, and fuel efficiency is improved.

Next, when the battery 30 is in the directly connected state, so that control of the FC 20 is not disrupted (so that controllability of the FC 20 is not lost), and in order to guarantee the step-up operation of the FC converter 24, monitoring is performed as to whether or not the inverter-to-FC voltage difference ΔVif when the BAT converter 34 is directly connected (ΔVif=Vbat−Vfc), which is a difference between the inverter terminal voltage Vinv=bat and the FC voltage Vfc, has decreased to the first margin voltage Vmar1 (direct connection inverter-to-FC difference voltage monitoring process K2).

When the BAT converter 34 direct connection inverter-to-FC difference voltage ΔVif has decreased to the first margin voltage Vmar1, a target for the inverter terminal voltage (target inverter terminal voltage) Vinvtar is set such that the switching loss of the BAT converter 34 does not become excessively large when the stopped state of the BAT converter 34 is released, and the BAT converter 34 is controlled in a step-up state or a step-down state (target inverter terminal voltage setting process K3).

The target inverter terminal voltage Vinvtar here is set to a value of Equation (2) in which the second margin voltage Vmar2 (the first margin voltage Vmar1+the BAT converter ripple voltage component Vbatconvrpl) described above is added to the FC voltage Vfc.

$$Vinvtar = Vfc + Vmar2 \quad (2)$$

Control is then performed so as to release the stopped state (directly connected state) of the BAT converter 34, and to transition the BAT converter 34 to a step-up state or a step-down state (BAT converter voltage step-up/step-down transition process K4).

Figure 6:
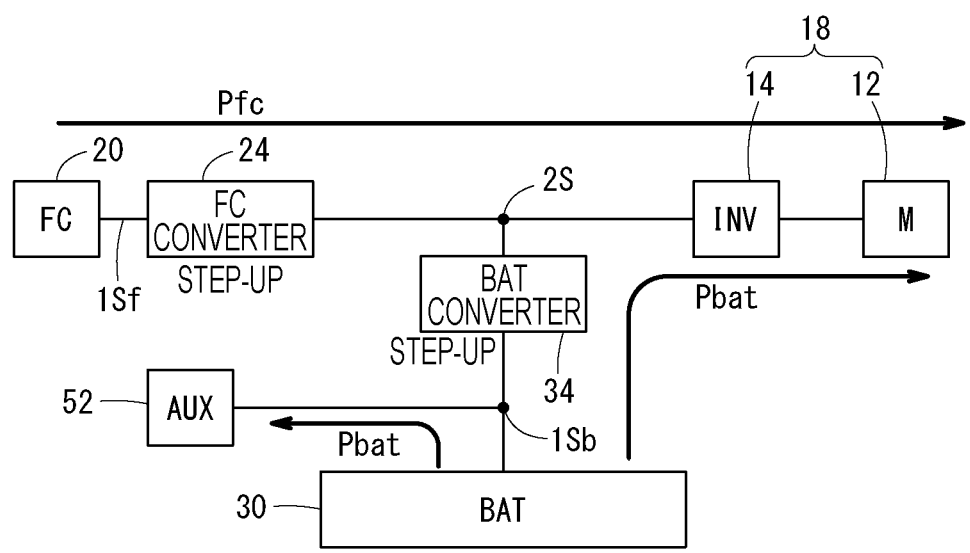
FIG. 6 is a block diagram illustrating a flow of power during driving with rapid acceleration, with an energy storage device side converter in step-up state.

In a step-up process of a BAT converter voltage step-up/step-down process K5, as illustrated in FIG. 6, applied, for example, during driving the FC vehicle 10 with acceleration, a comparatively large FC power Pfc is supplied as traction power to the load 18 (to the motor 12 through the inverter 14), through the FC converter 24 in the step-up state. At the same time, a comparatively large battery power Pbat is supplied as traction power to the load 18 through the BAT converter 34 in the step-up state. Moreover, a comparatively small battery power Pbat is supplied to the auxiliary equipment 52. However, the battery power Pbat supplied to the auxiliary equipment 52 is still larger than the battery power Pbat during low speed cruising or the like by the amount of increase of the power to the air pump in the auxiliary equipment 52 (FIG. 4A).

Figure 7A:
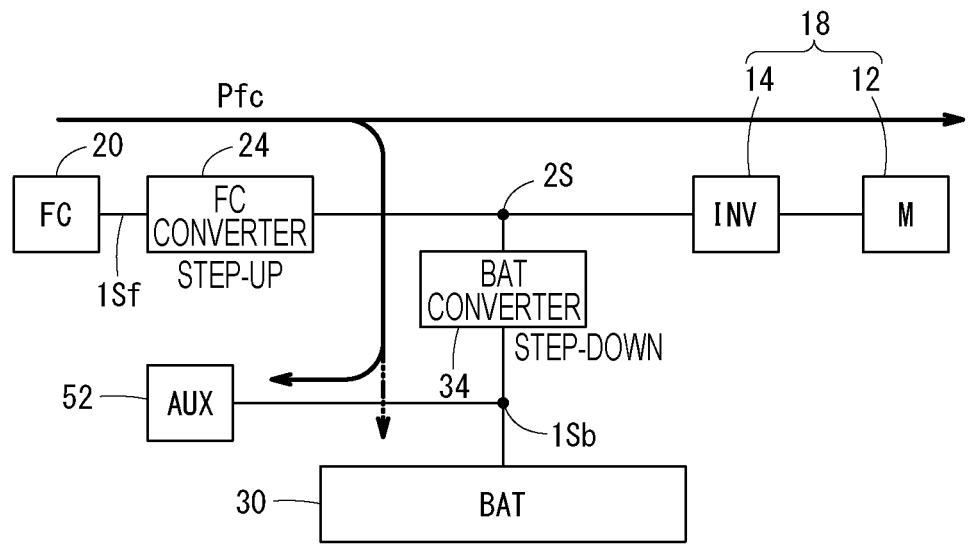
FIG. 7A is a block diagram illustrating a flow of power during high speed cruising, with an energy storage device side converter in step-down state.

In a step-down process of the BAT converter voltage step-up/step-down process K5, as illustrated in FIG. 7A, applied, for example, during driving the FC vehicle 10 in high speed cruising, from out of the comparatively large FC power Pfc, a medium level of power is supplied as traction power to the load 18 (to the motor 12 through the inverter 14), through the FC converter FC converter 24 in step-up state, and the remaining power therefrom is split at the secondary side 2S and supplied to the auxiliary equipment 52 through the BAT converter 34 in step-down state, and, when there is excess remaining thereof, to the battery 30 as charging power.

Note that high speed means a vehicle speed of generally 80 km/h to 160 km/h≈100 miles/h and greater (depending on vehicle type).

Figure 7B:
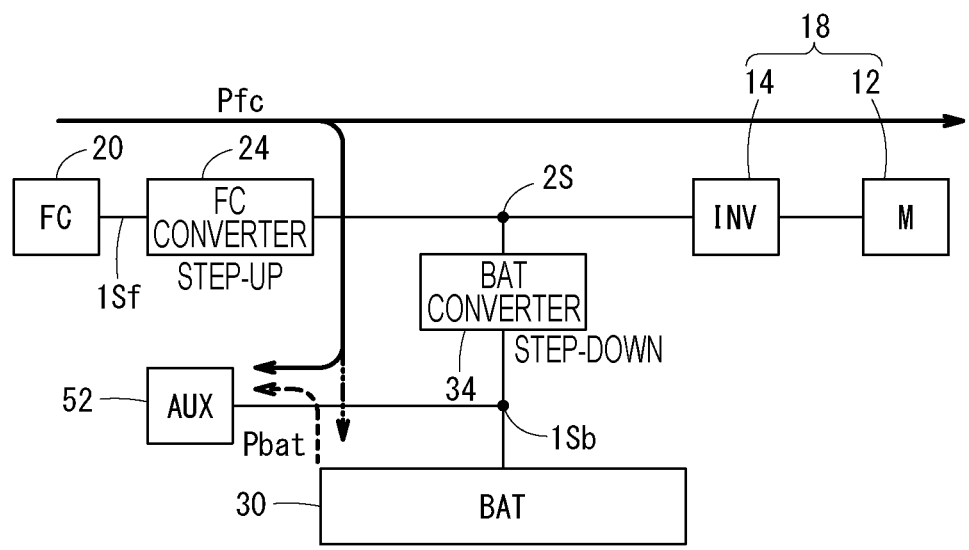
FIG. 7B is a block diagram illustrating a flow of power during driving while decelerating or driving while accelerating, with the energy storage device side converter in step-down state.

In a step-down process of the BAT converter voltage step-up/step-down process K5, as illustrated in FIG. 7B, applied, for example, when driving the FC vehicle 10 with comparatively gradual deceleration (during gentle deceleration) or with comparatively gradual acceleration (during gentle acceleration), the FC power Pfc is supplied, as traction power, to the load 18 (to the motor 12 through the inverter 14), through the FC converter 24 in step-up state, and is split at the secondary side 2S and supplied to the auxiliary equipment 52 through the BAT converter 34 in step-down state, and, when there is excess remaining thereof during driving while decelerating, is supplied to the battery 30 as charging power. In cases in which there is insufficient FC power Pfc during driving while accelerating, battery power Pbat of the deficient amount is supplied from the battery 30 to the auxiliary equipment 52, as indicated by the dashed arrow.

Next, in the BAT converter voltage step-up/step-down process K5, a step-up/step-down inverter-to-BAT difference voltage Vib (ΔVib=Vinv−Vbat), which is the difference voltage between the inverter terminal voltage Vinv and the battery voltage Vbat, is monitored, and monitoring is performed as to whether or not the inverter terminal voltage Vinv and the battery voltage Vbat have approached each other and become same voltage (Vinv=Vbat→ΔVib=0) (step-up/step-down inverter-to-BAT difference voltage monitoring process K6).

When the inverter terminal voltage Vinv and the battery voltage Vbat have become the same voltage (Vinv=Vbat→ΔVib=0), transition is made to the BAT converter direct connection process K1 by transitioning the BAT converter 34 to the stopped state so that the battery 30 and the inverter 14 are placed in the directly connected state.

Explanation Regarding Comparative Examples

Detailed explanation follows of issues with a fuel cell vehicle, serving as a comparative example of a fuel cell system, discussing, in sequence, assumptions, Issue 1, and Issue 2.

Assumptions

In a fuel cell vehicle of a comparative example (referred to below as FC vehicle 10C (not illustrated in the drawings)), the processing in the exemplary embodiment described above for setting the margin voltage Vmar (the first margin voltage Vmar1 and the second margin voltage Vmar2) of the FC vehicle 10 is not performed. Although the FC vehicle 10C of the comparative example is not illustrated in the drawings, for ease of understanding, explanation will be given with reference to the configuration elements of the FC vehicle 10 of the exemplary embodiment as appropriate.

In the FC vehicle 10C of the comparative example too, from the perspective of improving fuel efficiency, when in a specific load state, for example a low load state, the FC converter 24 is switching (step-up) operated, and switching operation of the BAT converter 34 is stopped, such that the battery voltage Vbat is applied to the directly connected inverter terminal as an inverter terminal voltage Vinv (so as to directly connect the battery 30).

In cases in which there is a low load state, from the perspective of improving fuel efficiency, the FC 20 is controlled to a low load generation state. However, in order to maintain control in this low load generation state, the FC converter 24 is maintained in a step-up state, such that the FC voltage Vfc is controlled by the FC converter 24. Namely, the FC converter 24 is feed-back controlled such that the step-up ratio of the FC converter 24 becomes Vinv (=Vbat)/Vfc.

Issue 1

Figure 8:
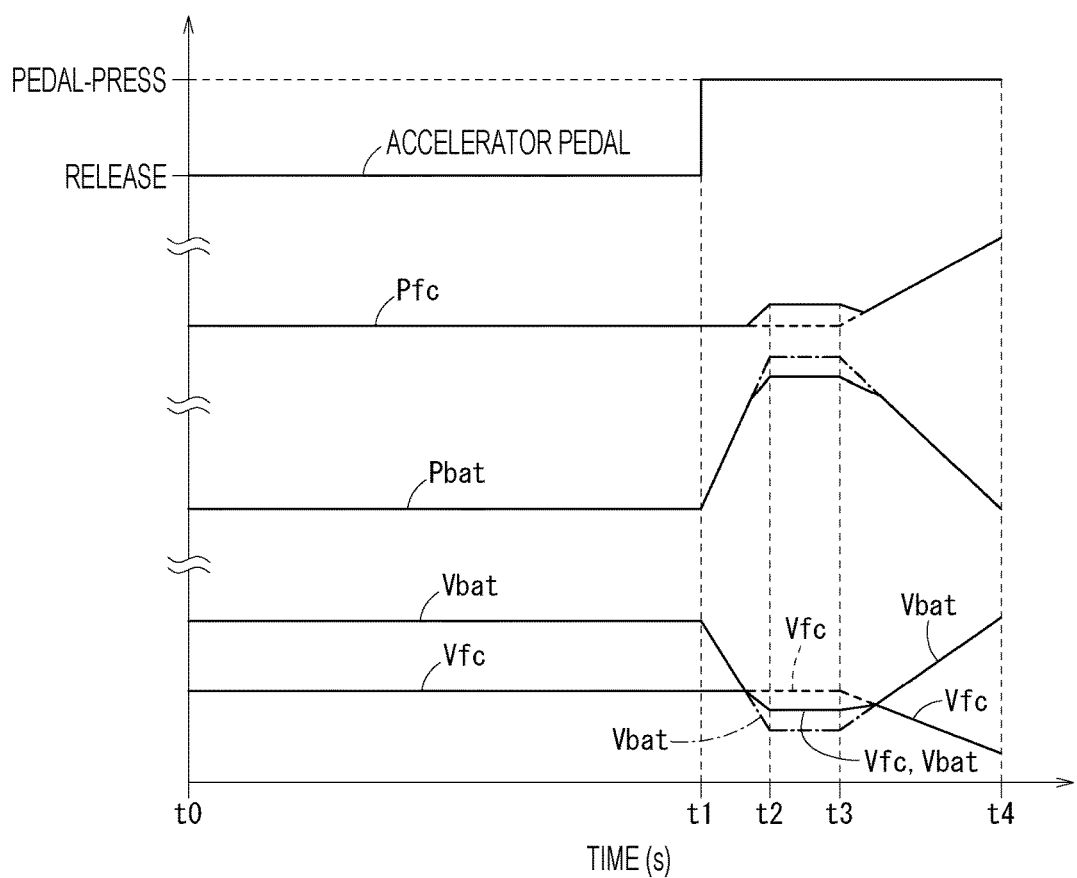
FIG. 8 is a timing chart to accompany explanation of a first issue during driving while accelerating when there is low load power generation, according to a comparative example.

Explanation follows regarding Issue 1, with reference to FIG. 8. Explanation follows regarding a state, during a released (non-pressed) state (θap=0) of the accelerator pedal 114 in the period from time t0 to time t1 in a low load generation state in which the FC vehicle 100 of the comparative example is stopped (corresponding to during idling stop of FIG. 5A), when, at time t1, the accelerator pedal 114 is pressed from the released state (non-pressed state) and launching acceleration is started.

In the period from time t1 to time t4 too, since this is also a low load generation state, basically, the FC converter 24 is controlled to a step-up state, and the BAT converter 34 is controlled to a directly connected state (corresponding to driving while gently accelerating of FIG. 4A).

Thus as a result the FC vehicle 10C is ultimately controlled in the period from time t0 to time t1 so as to achieve a directly connected state of the battery in which Vfc<Vinv=Vbat.

When the accelerator pedal 114 is pressed at time t1 and launch acceleration is performed, the battery power Pbat increases rapidly, and so, accompanying this action, the battery voltage Vbat decreases rapidly.

In this case, the target value of the FC power Pfc is controlled so as to be a constant power in the period from time t1 to time t3, as indicated by the dashed line segment, and so as to gradually increase from time t3 onwards. Note that the target value of the FC voltage Vfc is controlled so as to be a constant voltage in the period from time t1 to time t3, as indicated by the dashed line segment, and so that the FC voltage Vfc gradually decreases from time t3 onwards in order to increase the FC power Pfc.

In such cases, accompanying the rapid decrease in the battery voltage Vbat=Vinv in the period from time t1 to time t2, the battery voltage Vbat=Vinv falls below the FC voltage Vfc during the period from time t1 to time t2 (Vfc>Vbat=Vinv). When this occurs, the FC converter 24 is no longer able to perform step-up operation, and adopts a directly connected state, such that, as illustrated by the solid line just before the time t2, the FC voltage Vfc is dragged down by the battery voltage Vbat=Vinv and falls therewith.

In this manner, when the battery 30 is directly connected, if the inverter terminal voltage Vinv=Vbat falls below the FC voltage Vfc, due to the FC converter 24 being unable to maintain the step-up state and the FC 20 unintentionally adopting a directly connected state, control of the FC power Pfc is no longer effective (becomes instable), and, as illustrated by the solid line, in the period from time t2 to time t3 the FC power Pfc is temporarily pulled up to the target power value illustrated by the dashed line or above. In a state in which the FC power Pfc is pulled up to above the target power value, the first issue (instable control of the FC 20 during driving while accelerating) arises in that the gas stoichiometric ratio (amount of gas supplied/amount of gas consumed) is in an insufficient state, with the possibility of a detrimental effect on the durability of the FC 20.

An example has been explained in which the first issue arises during transition of the accelerator pedal 114 from the released state to the pressed state (during launch acceleration); however, there is no limitation thereto. The first issue also similarly arises during transition from first low speed cruising (with a pedal-press amount θap1 of the accelerator pedal 114) to second low speed cruising (with a pedal-press amount θap2; θap1<θap2) (during driving acceleration).

Second Issue

Figure 9:
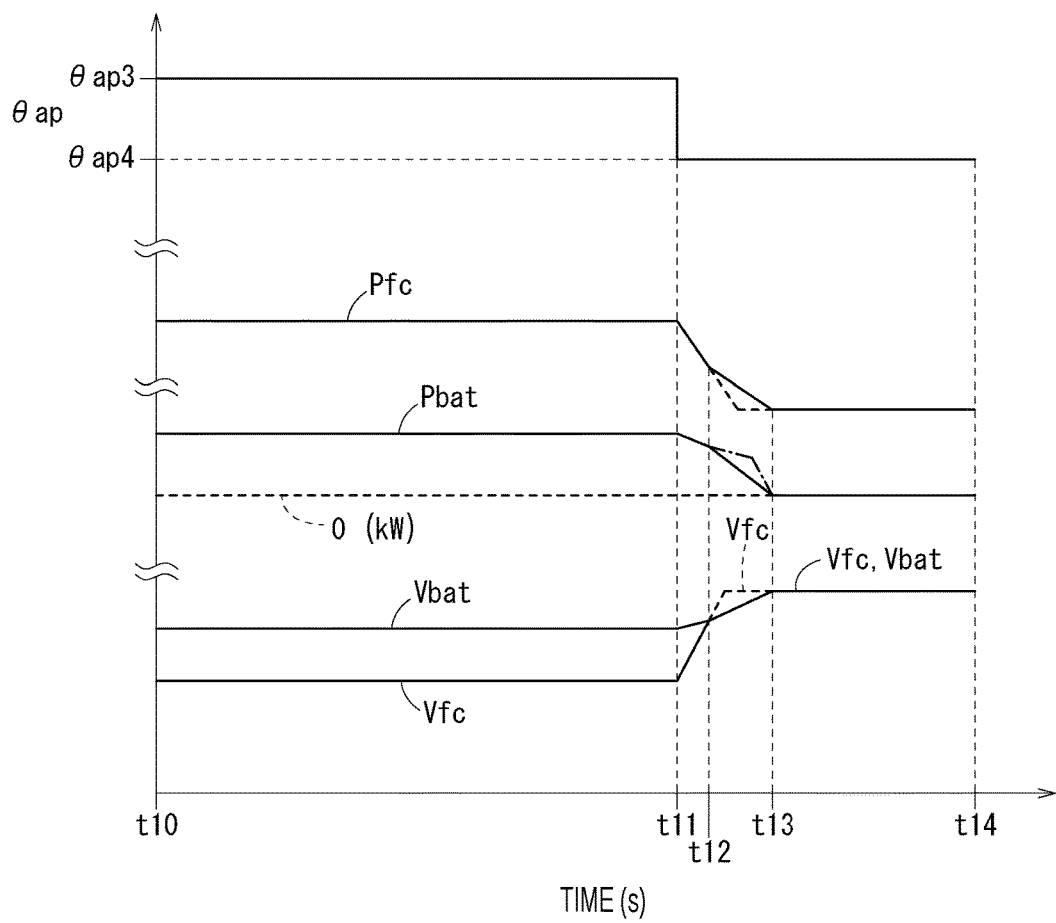
FIG. 9 is a timing chart to accompany explanation of a second issue when power generation is reduced during driving while decelerating, according to a comparative example.

Explanation follows regarding the second issue, with reference to FIG. 9. During third low speed cruising in the period from time t10 to time t11 (in which the pedal-press amount of the accelerator pedal 114 is a pedal-press amount θap3), due to this being a low load state, control is performed to place the FC converter 24 in the step-up state, and to place the BAT converter 34 in the directly connected state (corresponding to the low speed cruising of FIG. 4A). In the period from time 10 to the time t11, traction is under the combined power of the FC power Pfc and the battery power Pbat. In such cases too, control is made to the state of Vfc<Vbat=Vinv in the period from the time t10 to the time t11.

When the pedal-press amount of the accelerator pedal 114 is reduced from the pedal-press amount θap3 to a pedal-press amount θap4 at time t11, the FC power Pfc and the battery power Pbat adopt a gradually reducing state (from time t11 onward, corresponding to driving while decelerating in FIG. 4C).

In such cases, the battery voltage Vbat increases with a comparatively gentle slope due to the internal voltage drop decreasing, and the FC voltage Vfc changes at the side near to the side of the FC open circuit voltage VfcOCV, and so increases with a comparatively steep slope (see FIG. 2).

Therefore, at time t12, the battery voltage Vbat=Vinv falls below the FC voltage Vfc. When this occurs, the FC converter 24 is unable to perform step-up operation and adopts a directly connected state, and, as illustrated by the solid line, from time t12 onwards, the FC voltage Vfc is dragged by the battery voltage Vbat=Vinv and increases therewith with a gentle slope.

In this manner, when the inverter terminal voltage Vinv=Vbat falls below the FC voltage Vfc, due to the step-up state of the FC converter 24 no longer being able to be maintained and a directly connected state being unintentionally adopted, control of the FC power Pfc ceases to be effective, and, in the period from time t12 to time t13, the FC power Pfc is sometimes temporarily pulled up to the target power value as illustrated by the dashed line or above. In such a state in which the FC power Pfc has been pulled up to the target power value or above, the gas stoichiometric ratio (the amount of gas supplied/the amount of gas consumed) becomes insufficient, and the second issue arises of there being the possibility of a detrimental effect on the durability of the fuel cells (instability in control of the FC 20 during driving while decelerating).

Explanation of Resolution of the First Issue (Instability in Control of the FC 20 During Driving while Accelerating)

Next, explanation follows regarding resolution of Issue 1 by the embodiment described above, with reference to the timing chart of FIG. 10.

During low speed cruising (BAT converter direct connection process K1) as illustrated in FIG. 4A, when, in order to accelerate, the pedal-press amount θap of the accelerator pedal 114 is increased at time t21, the BAT converter 34 direct connection inverter-to-FC difference voltage ΔVif (Vif=Vbat−Vfc), which is the difference voltage between the inverter terminal voltage Vinv=Vbat, and the FC voltage Vfc, is monitored (direct connection inverter-to-FC difference voltage monitoring process K2).

When the BAT converter 34 direct connection inverter-to-FC difference voltage ΔVif has become as low as the first margin voltage Vmar1 at time t22, the target inverter terminal voltage Vinvtar is set to a voltage of the second margin voltage Vmar2 (Vmar2=Vmar1 +Vbatconvrpl) added to the FC voltage Vfc (target inverter terminal voltage setting process K3, see Equation (2)).

At time t22, the stopped state of the BAT converter 34 (the directly connected state) is released, and the BAT converter 34 transitions to the step-up state of "driving while accelerating: step-up" illustrated in FIG. 6 (BAT converter voltage step-up/step-down transition process K4).

In this manner, when driving while accelerating as indicated by the hatching, the directly connected state of the FC converter 24 is avoided before it occurs, eliminating the concern of instability arising in control of the FC 20.

In the step-up state from time t22 onwards, as stated above, the "driving while accelerating: stepping-up" state is adopted as explained with reference to FIG. 6, and the battery voltage Vbat gradually falls.

During the BAT converter voltage step-up/step-down process K5, which is during acceleration from time t22 onwards (in this case step-up of the BAT converter 34), when, at time t23, the pedal-press amount θap of the accelerator pedal 114 becomes constant, part of the FC power Pfc may be allocated to the BAT converter 34 side, and so the FC vehicle 10 transitions to the step-down state during high speed cruising as illustrated in FIG. 7A, and the battery voltage Vbat increases gradually by the excess power of the FC power Pfc.

From the time t23 onwards, monitoring is performed as to whether or not the inverter terminal voltage Vinv and the battery voltage Vbat have approached each other and become the same voltage by detecting (monitoring) the difference voltage Vib between the inverter terminal voltage Vinv and the battery voltage Vbat (Vib=Vinv−Vbat) (step-up/step-down inverter-to-BAT difference voltage monitoring process K6).

Figure 5B:
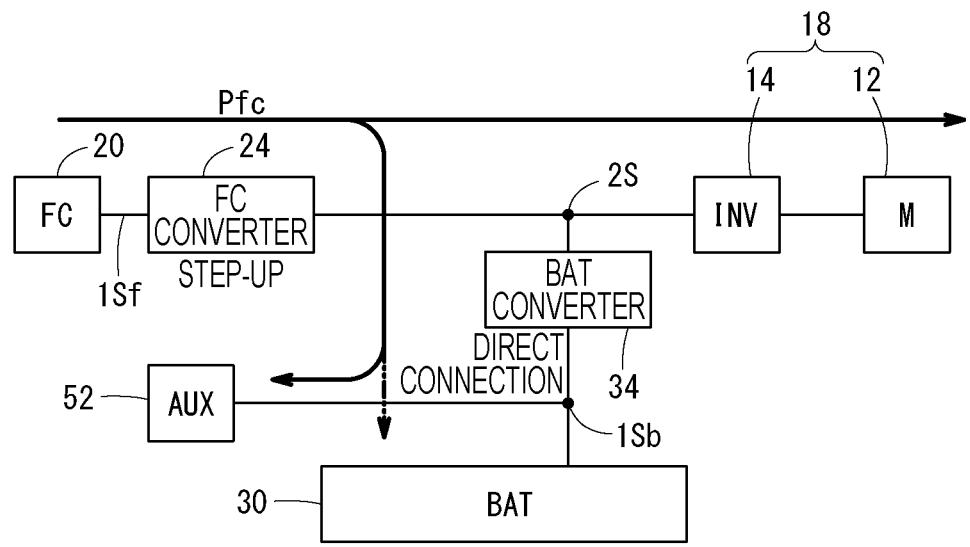
FIG. 5B is a block diagram illustrating a flow of power during high speed cruising, with the energy storage device side converter in a directly connected state.

At time t24, when the inverter terminal voltage Vinv and the battery voltage Vbat have become the same voltage, the BAT converter 34 is transitioned to the stopped state such that the battery 30 and the inverter 14 are placed in a directly connected state (BAT converter direct connection process K1). In such cases, the directly connected state is adopted during high speed cruising, as illustrated in FIG. 5B.

As described later, at time t23, the BAT converter 34 transitions from the step-up state to the step-down state, and secondary side current Ibat2 switches flow direction from the discharge direction current Ibat2d to the charge direction current Ibat2c. Hence, since the secondary side current Ibat2, or in other words the current passing through the BAT converter 34, is temporarily a value of zero when the current flow direction switches, a so-called zero crossing state arises.

Explanation Regarding Resolution of the Second Issue (Instability in Control of the FC 20 During Driving while Decelerating)

Figure 11:
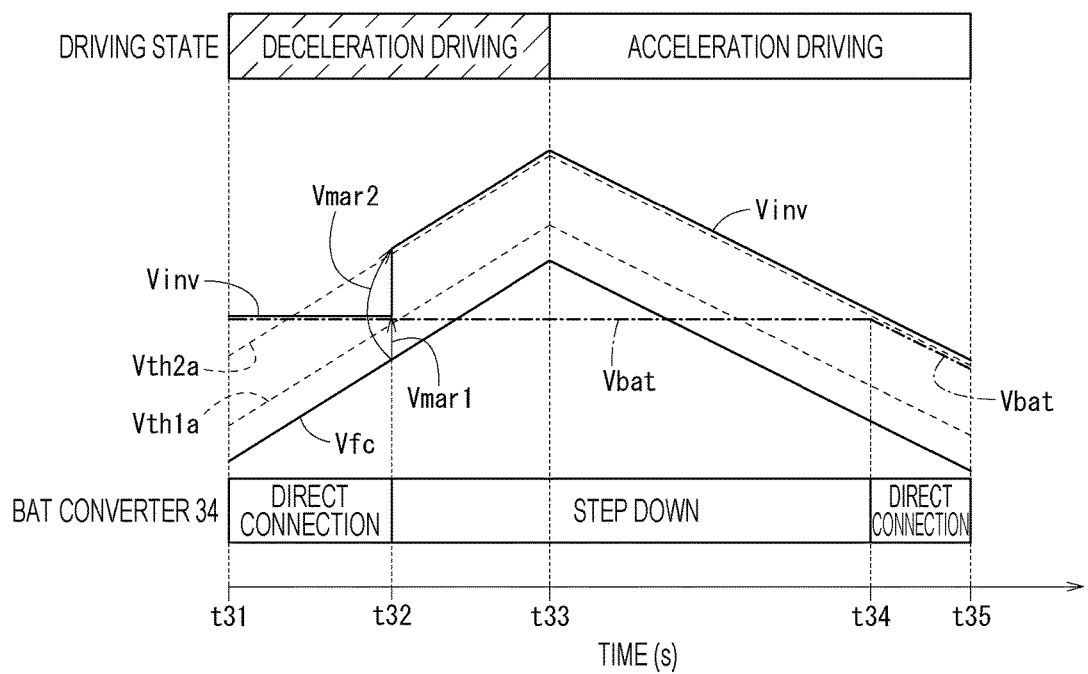
FIG. 11 is a timing chart to accompany explanation of resolution by an embodiment of the second issue.

Explanation follows regarding resolution of the second issue by the embodiment described above, with reference to the timing chart illustrated in FIG. 11.

In the timing chart of FIG. 11, the hatching in the period from time t31 to time t33 indicates driving while decelerating, and the period from time t31 to time t32 indicates the driving state "driving while decelerating: direct connection" of FIG. 4C, and the period from time t32 to time t33 indicates the driving state of "driving while decelerating: stepping-down" of FIG. 7B.

The period from time t33 to time t35 indicates driving while accelerating, and the period from time t33 to time t34 indicates the driving state of "driving while accelerating: step-down" of FIG. 7B, and the period from time t34 to time t35 indicates the driving state of "driving with gentle acceleration: directly connected" of FIG. 4A.

In driving while decelerating in the period from time t31 to time t33, the ECU 50 reduces the FC power Pfc (increasing the FC voltage Vfc) according to an operation reducing the pedal-press amount θap of the accelerator pedal 114. During the driving while accelerating in the period from time t33 to time t35, the FC power Pfc is increased (decreasing the FC voltage Vfc) according to operation increasing the pedal-press amount θap of the accelerator pedal 114.

For ease of understanding, consider a case in which, in the period from time t31 to time t34, the battery 30 has a constant battery voltage Vbat for generating the primary side voltage (bias voltage) of the BAT converter 34, and the battery power Pbat is a value of zero.

During gentle deceleration driving in the period from time t31 to time t32 (BAT converter direct connection process K1), as illustrated in FIG. 4C, the BAT converter 34 adopts a directly connected state (Vinv=Vbat), and the FC power Pfc is gradually reduced and the FC voltage Vfc is gradually increased according to the operation of the accelerator pedal 114 toward the release side (a reduction in the pedal-press amount θap).

During gentle deceleration driving in the period from time t31 to time t32 (BAT converter direct connection process K1), the BAT converter 34 direct connection inverter-to-FC difference voltage ΔVif (Vif=Vbat−Vfc), which is the difference voltage between the inverter terminal voltage Vinv=Vbat and the FC voltage Vfc, is monitored (direct connection inverter-to-FC difference voltage monitoring process K2).

At the time t32 when the BAT converter 34 direct connection inverter-to-FC difference voltage Δbf has become as low as the first margin voltage Vmar1, the target inverter terminal voltage Vintvar is set to a voltage of the second margin voltage Vmar2 added to the FC voltage Vfc (target inverter terminal voltage setting process K3, see Equation (2)).

At time t32, the stopped state (directly connected state) of the BAT converter 34 is released, and the BAT converter 34 transitions to the step-down state as illustrated in FIG. 7B (BAT converter voltage step-up/step-down transition process K4).

In this manner, during driving while decelerating, as illustrated by the hatching, the directly connected state of the FC converter 24 is avoided before it occurs, eliminating the concern of instability arising in control of the FC 20.

During driving while decelerating in the period from time t31 to time t32, the FC power Pfc is decreased, however, in order that the FC voltage Vfc does not become higher than the inverter terminal voltage Vinv=Vbat, a limit is placed on the speed of reduction in the FC power Pfc while watching the inverter terminal voltage Vinv=Vbat, such that even though the FC power Pfc is reduced, an unintentional directly connected state of the FC converter 24 can be avoided before it occurs.

In the period from time t32 to time t33, the FC power Pfc is gradually decreased and the FC voltage Vfc is gradually increased according to the operation of the accelerator pedal 114 toward the release side (reduction in the pedal-press amount θap) (BAT converter voltage step-up/step-down process K5).

There is a switch in operation of the accelerator pedal 114 toward the pressing side (an increase in the pedal-press amount θap) at time t33, and from time t33 onward, the FC power Pfc is gradually increased and the FC voltage Vfc is gradually decreased according to the increase in the pedal-press amount θap of the accelerator pedal 114.

During driving while accelerating from time t33 onward, the step-up/step-down inverter-to-BAT difference voltage Vib (Vib=Vinv−Vbat), which is the difference voltage between the inverter terminal voltage Vinv and the battery voltage Vbat, is detected, and monitoring is performed as to whether or not the inverter terminal voltage Vinv and the battery voltage Vbat have approached each other and become the same voltage (Vinv=Vbat) (step-up/step-down inverter-to-BAT difference voltage monitoring process K6).

At time t34, when the inverter terminal voltage Vinv and the battery voltage Vbat have become the same voltage as each other, the BAT converter 34 transitions to the stopped state such that the battery 30 and the inverter 14 are in a directly connected state (BAT converter direct connection process K1). Such cases are a directly connected state during gentle acceleration driving, as illustrated in FIG. 4A.

Summary of Embodiment

As explained above, the FC vehicle 10 serving as the fuel cell system according to the embodiment described above includes the FC 20 that generates the generation voltage FC voltage Vfc, the battery 30 that generates the battery voltage Vbat, the motor 12 that generates motive force, the inverter 14 that drives the motor 12, the BAT converter 34 that is disposed between the input terminals of the battery 30 and the inverter 14, and that switches between a directly connected state without voltage transforming and a voltage transforming state in which there is voltage transformation between the battery voltage Vbat and the inverter terminal voltage Vinv, and the FC converter 24 that is disposed between the input terminals of the FC 20 and the inverter 14, and that steps up the FC voltage Vbat to the inverter terminal voltage Vinv.

The control method of the FC vehicle 10 according to the embodiment described above includes a margin voltage setting process that sets the margin voltage Vmar to guarantee step-up operation of the FC converter 24 (margin voltage setting and control process K0), and an inverter terminal voltage control process in which the BAT converter 34 is controlled to the directly connected state or to the voltage transforming state (step-up state or step-down state) so that the inverter terminal voltage Vinv does not fall below the voltage of the margin voltage Vmar added to the FC voltage Vfc (Vfc+Vmar) (Vinv≥Vfc+Vmar) (process K1 to process K6).

In this manner, the inverter terminal voltage Vinv is controlled so as not to fall below the voltage of the margin voltage Vmar, to guarantee step-up operation of the FC converter 24, added to the FC voltage Vfc (Vfc+Vmar) (such that Vinv≥Vfc+Vmar), thereby enabling a situation in which the FC voltage Vfc becomes higher than the inverter terminal voltage Vinv, the FC converter 24 adopts a directly connected state, and there is an instable state of control of the FC voltage Vfc, to be reliably avoided.

Note that the margin voltage Vmar is set to a minimum voltage (lower limit margin voltage) in a range capable of maintaining the FC converter 24 in the normal step-up state, enabling a drop in fuel efficiency that accompanies setting of the margin voltage Vmar to be minimized, and enabling an improvement in fuel efficiency.

The FC vehicle 10 according to the present embodiment accordingly enables both an improvement in controllability (suppresses a reduction therein), and an improvement in fuel efficiency.

MODIFIED EXAMPLES

Explanation follows regarding modified examples of the present embodiment.

The modified examples mainly relate to setting, updating, and control of the margin voltage Vmar by the margin voltage setting/controlling section 51.

Figure 12:
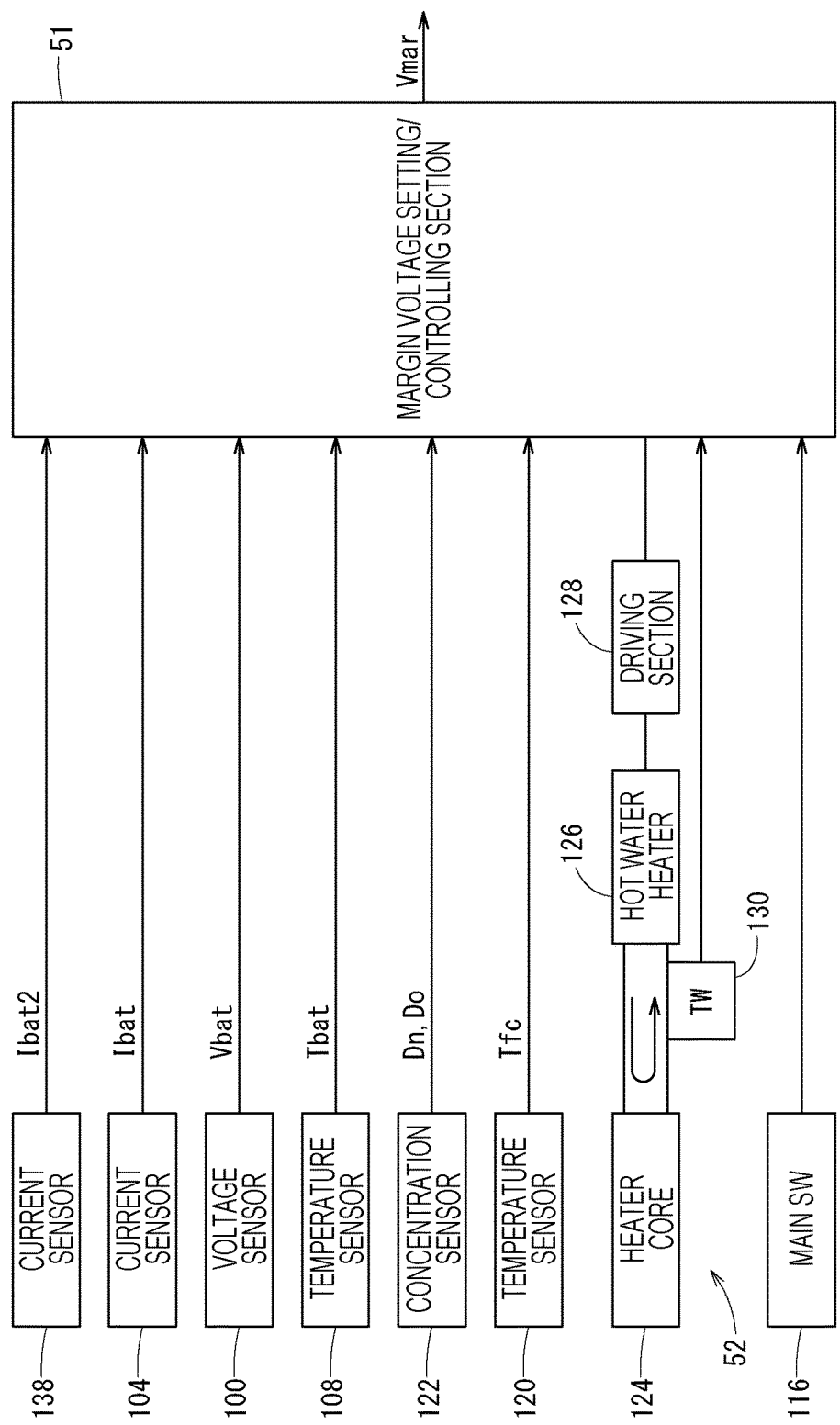
FIG. 12 is a block diagram accompanying explanation of Modified Examples to explain a relationship between a margin voltage setting and control section, and input devices.

FIG. 12 is a block diagram to accompany explanation of the margin voltage setting/controlling section 51 in explanation of the modified examples, and to explain connection relationships of input devices to the margin voltage setting/controlling section 51.

Modified Example 1

Concerning Zero Value Crossing of the BAT Converter 34

Fluctuations (overshoot and ringing) occur in the inverter terminal voltage Vinv at the time t23 explained with reference to FIG. 10, on transition of the BAT converter 34 from the step-up state (where the switching element S21 is ON/OFF duty controlled, and the switching element S22 is OFF) to the step-down state (in which the switching element S22 is ON/OFF duty controlled, and, for example, the current flow direction of the secondary side current Ibat2, this being current passing through the BAT converter 34, switches from the discharge direction current Ibat2d to the charge direction current Ibat2c (when the current value crosses the zero value)). Such a voltage fluctuation is a reason so-called dead time is provided in pulse width modulation (PWM) control of the switching elements S21, S22 in order to prevent the switching element S21 and the switching element S22 from both being ON at the same time. Controllability of the FC 20 is lost if the FC converter 24 adopts a directly connected state due to such voltage fluctuations.

Figure 13:
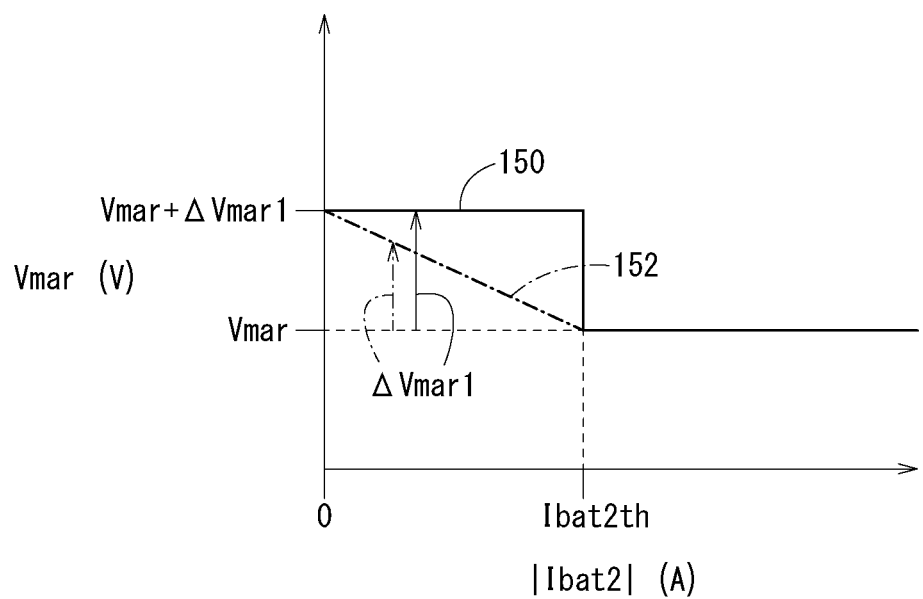
FIG. 13 is a graph of a characteristic of increased margin voltage with reference to current passing through an energy storage device side converter to accompany explanation of a Modified Example 1.

In order to address this, as illustrated in the characteristic (map) 150 of FIG. 13, control (update) is performed such that an increased margin voltage ΔVmar1 is added to the margin voltage Vmar (Vmar←Vmar+ΔVmar1) when the magnitude |Ibat 2| (absolute value) of the secondary side current Ibat2 being detected by the current sensor 138 has become a value less than a pre-determined threshold current value Ibat2th.

Control may be performed, like characteristic 152 illustrated by the single dot dashed line, such that the increased margin voltage ΔVmar1 becomes greater as the magnitude |Ibat2| approaches zero (A).

Moreover, in the characteristics 150, 152, in cases in which the magnitude |Ibat 2| of the secondary side current Ibat2 is smaller than the threshold current value Ibat2th and the margin voltage Vmar+the increased margin voltage ΔVmar1 is substituted by a rate R as the vertical axis of FIG. 13, the margin voltage Vmar may be multiplied by R (R>1), and the margin voltage Vmar×R (R=1) set as =Vmar when the magnitude |Ibat2| of the secondary side current Ibat2 is larger than the threshold current value Ibat2th. In the following explanation too, the increased margin voltage is also substitutable by a rate R.

In this manner, in Modified Example 1, the margin voltage setting/controlling section 51 detects the secondary side current Ibat2 which is the current passing through the BAT converter 34, and sets a larger margin voltage Vmar as the margin voltage Vmar←Vmar+ΔVmar1 in cases in which the detected secondary side current Ibat2 is the threshold current value Ibat2th or less when the current flow direction is changing and is a value close to zero.

Doing so gives certainty that the inverter terminal voltage Vinv on the low voltage side (the bottom peak side) is maintained higher than the FC voltage Vfc, even for large amplitude fluctuations (voltage fluctuations) in the inverter terminal voltage Vinv being controlled by the BAT converter 34, enabling controllability of the FC 20 to be secured.

Note that the current passing through the BAT converter 34 may be measured as the current passing through the inductor L2, which is the primary side current of the BAT converter 34.

Modified Example 2

Concerning Temperature Tbat and Internal Resistance of Battery 30

Figure 14A:
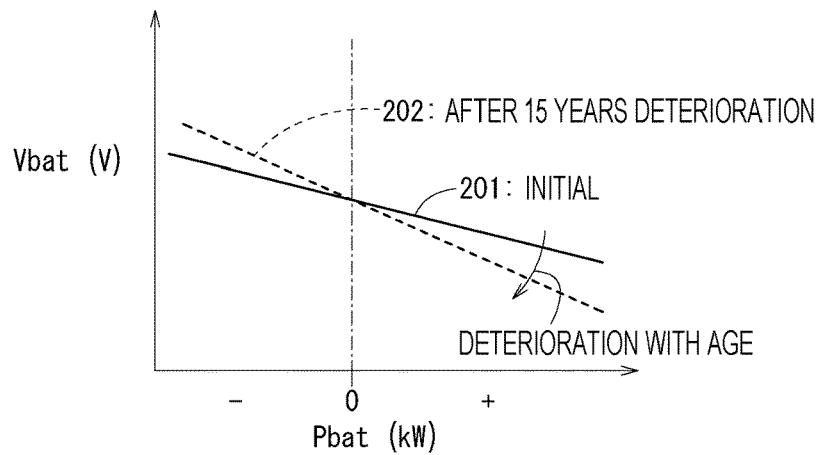
FIG. 14A is a graph of characteristics of voltage against power due to changes in internal resistance of a battery, illustrating an initial characteristic and an age deteriorated characteristic after the elapse of 15 years.

FIG. 14A illustrates initial characteristic 201 of power-voltage characteristic according to changes in the internal resistance of the battery 30, and deterioration-over-time characteristic 202 after 15 years have elapsed. For example, it is apparent that whereas in the initial characteristic 201 there is a tendency for the battery voltage Vbat to get smaller since the voltage step-down due to the internal resistance gets larger as the discharge power of the battery power Pbat (Ibat×Vbat) gets larger (as illustrated on the positive side on the horizontal axis in FIG. 14A), in the deterioration-over-time characteristic 202 there is a larger voltage step-down due to larger internal resistance. Similar applies to the relationship between charging power and the battery voltage Vbat (as illustrated on the minus side on the horizontal axis in FIG. 14A).

Figure 14B:
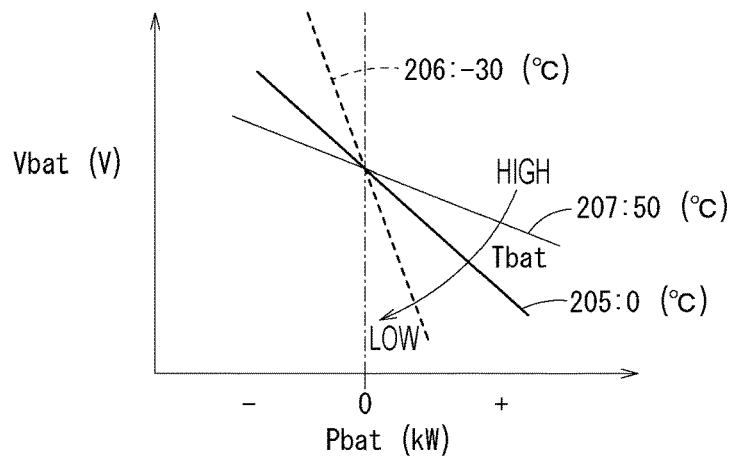
FIG. 14B is a graph of characteristics of voltage against power with changing battery temperature as a parameter.

FIG. 14B illustrates temperature characteristics 205, 206, 207 of the power-voltage characteristic with −30° C., 0° C., and 50° C., respectively, for the parameter of battery temperature Tbat.

It is apparent that the lower the battery temperature Tbat, the larger the internal resistance, and the larger the voltage step-down due to the internal resistance.

As the internal resistance gets larger, the fluctuation amplitude of the battery voltage Vbat becomes larger for the same battery power Pbat. As a result, the fluctuation amplitude in the inverter terminal voltage Vinv (Vinv=Vmar+Vbat) becomes larger, and so there is an increasing probability that the FC converter 24 enters a directly connected state.

Figure 14C:
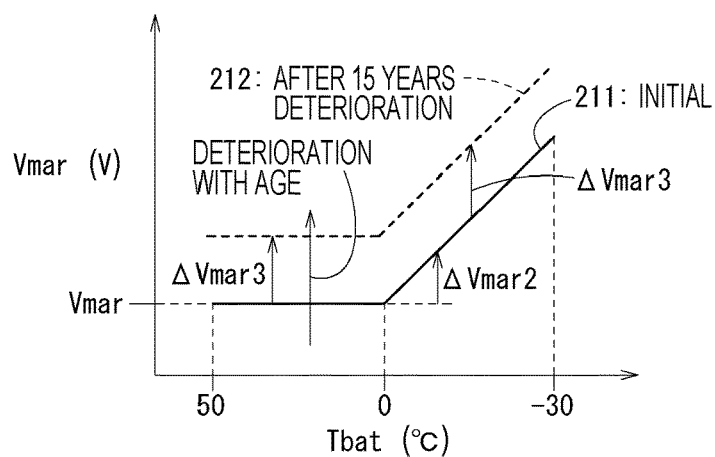
FIG. 14C is a graph of characteristics of increased margin voltage with respect to battery temperature and age deterioration to accompany explanation of Modified Example 2.

In order to address this, as illustrated by characteristic 211 (initial) and characteristic 212 (15 years deterioration) in FIG. 14C, control is performed such that as the battery temperature Tbat detected by the temperature sensor 108 becomes less than 0° C., which is the freezing point thereof, and as the number of years of deterioration progresses, an increased margin voltage ΔVmar2 is added to the margin voltage Vmar so as to make the margin voltage Vmar larger (Vmar←Vmar+ΔVmar2, Vmar←Vmar+ΔVmar3, or Vmar←Vmar+ΔVmar2+ΔVmar3, wherein ΔVmar3 increases with the elapsing of time).

In this manner, in the Modified Example 2, the margin voltage setting/controlling section 51 detects the battery temperature Tbat or the internal resistance (ΔR=ΔV/ΔI) of the battery 30, and, in cases in which the detected battery temperature Tbat is a temperature threshold value, for example, 0° C. or lower, in other words, in cases in which the internal resistance of the battery 30 is a corresponding internal resistance threshold value or lower, sets the margin voltage Vmar as a larger margin voltage Vmar←Vmar+ΔVmar2. This thereby gives certainty that the inverter terminal voltage Vinv on the low voltage side (bottom side) is maintained higher than the FC voltage Vfc even for a large fluctuation amplitude in the inverter terminal voltage Vinv controlled by the BAT converter 34, enabling controllability of the FC 20 to be secured.

Modified Example 3

Related to FC Vehicle 10 Start-Up

At start-up of the FC vehicle 10 when the main switch 116 is switched from the OFF state to the ON state, in cases in which it is determined that a state exists in which there is a need to fill the anode electrode paths and the cathode electrode paths of the FC 20 with fresh gas, for example, in a state in which a specific period of time, or greater, has elapsed since switching the main switch 116 to the OFF state the previous time, gas purging is executed to supply more hydrogen and oxidizing gas at start-up than that during a normal electricity generation state.

The battery voltage Vbat falls at start-up when gas purging is executed and power is drawn from the battery 30 according to the load requirements of the auxiliary equipment 52 etc., and conceivably the FC voltage Vfc might become higher than the battery voltage Vbat, and the FC converter 24 adopt a directly connected state. In such cases, due to there already being a low stoichiometric ratio state in the FC 20, an even more serious gas deficient state arises, directly leading to deterioration of the electrolyte membrane.

Figure 15:
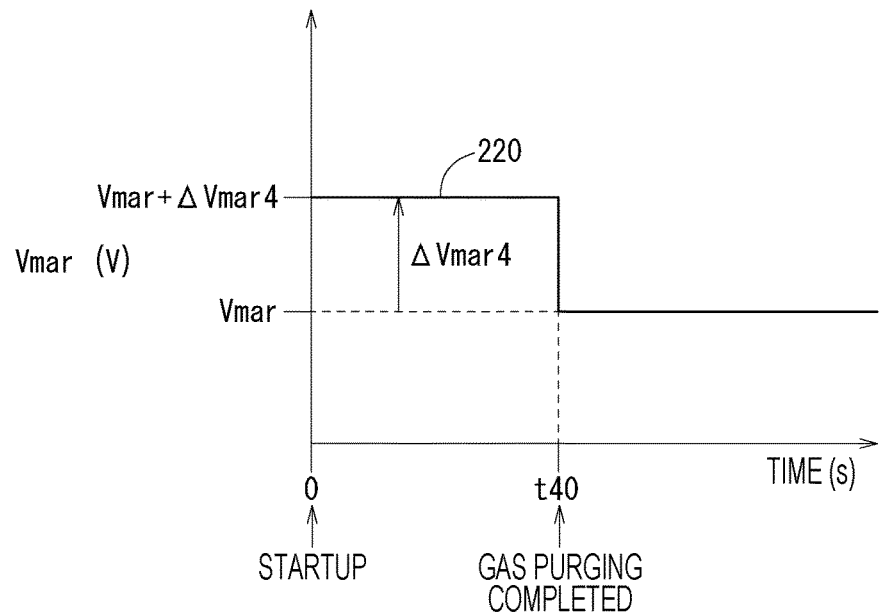
FIG. 15 is a graph of a characteristic of increased margin voltage at start-up to accompany explanation of Modified Example 3.

In order to address this, as indicated by the characteristic 220 in FIG. 15, in cases in which the gas purging is being executed on start-up from time 0 to time t40 in order to externally expel hydrogen gas and/or oxidizing gas remaining in the FC 20, the margin voltage Vmar is set as a larger margin voltage Vmar←Vmar+ΔVmar4 for up until the end time t40 of start-up gas purging.

In this manner, at start-up of the FC vehicle 10, in cases in which it is determined that gas purging is being executed and there is the accompanying possibility of the stoichiometric ratio of the FC 20 entering a low stoichiometric ratio state, a larger margin voltage Vmar←Vmar+ΔVmar4 is set by adding an increased margin voltage ΔVmar4 to the margin voltage Vmar. This thereby enables an unintentional directly connected state of the FC converter 24 to be reliably avoided, such that control of the FC 20 (of the FC voltage Vfc) can be reliably performed.

The low stoichiometric ratio state and execution of the gas purging can be determined by a concentration sensor 122 from the oxygen concentration Do and the hydrogen concentration Dh.

Modified Example 4

Concerning FC Converter 24 Interrupt State

The battery 30 deteriorates from excessive charging. There is accordingly a need in the FC vehicle 10 to avoid excessive charging of the battery 30.

Charging of the battery 30 is performed by the FC power Pfc of the FC 20, the regeneration power Preg of the motor 12, and the like. When there is no regeneration power Preg present, and charging of the battery 30 is progressing in a driving state in which it looks like excessive charging will occur (for example, driving while decelerating in FIG. 4C, during idling stop in FIG. 5A, etc.), there is a need to monitor the SOC and to avoid (interrupt) excessive charging of the battery 30 by the FC power Pfc of the FC 20.

Figure 16:
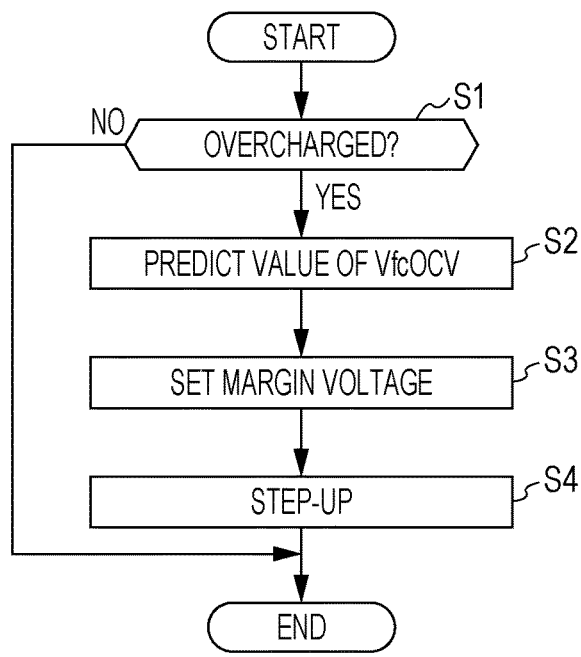
FIG. 16 is a flowchart for explaining operation when interrupting operation of a fuel cell side converter in a Modified Example 4.

In order to address this, as illustrated in the flowchart of FIG. 16, processing is performed to monitor the SOC of the battery 30 (indicated by a charged state (amount of charge remaining) of 100% when fully charged). The SOC of the battery 30 can be computed by detecting the battery temperature Tbat, the battery voltage Vbat, and the battery current Ibat.

At step S1, determination is made as to whether or not the SOC of the battery 30 is near to a fully charged state in which there is a concern that excessive charging may occur.

When determination is made that there is a concern that excessive charging may occur (step S1: YES), then, as preparation to interrupt output of the FC 20, at step S2, the present value of the open circuit voltage VfcOCV is predicted with reference to the present FC current Ifc and IV characteristic 90 (FIG. 2).

Next, at step S3, the margin voltage Vmar is set such that the difference voltage Vsub (Vsub=Vinv−VfcOCV) of the open circuit voltage VfcOCV subtracted from the inverter terminal voltage Vinv is a positive value (Vsub=Vinv−VfcOCV>0).

Namely, the margin voltage Vmar is set such that the following Equation (3) is satisfied.

$$Vinv = VfcOCV + Vmar \quad (3)$$

Finally, at step S4, the BAT converter 34 is placed in a step-up state such that the secondary side voltage of the BAT converter 34 becomes the inverter terminal voltage Vinv of Equation (3).

The diode D2 of the FC converter 24 is thereby placed in a reverse bias state, the FC converter 24 is placed in an interrupted state, interrupting charging of the battery 30 by the FC power Pfc, and avoiding excessive charging of the battery 30.

Modified Example 5

Concerning Step-Up Speed of Inverter Terminal Voltage Vinv

When, for example, as illustrated at time t22 of FIG. 10, during driving while accelerating in a directly connected state, when the BAT converter 34 is controlled from the directly connected state to the step-up state, the step-down speed Svbat (kW/s) of the BAT power Pbat drawn from the battery 30 becomes larger the larger a required speed Spreq (kW/s) of the load 18, for example during rapid acceleration. In such cases, were the step-down speed of the battery voltage Vbat to be larger than the step-up speed of the inverter terminal voltage Vinv under step-up speed control (so-called rate limiting), there would be a possibility that Vfc>Vbat. In order to avoid such a situation arising, there is a need to perform speed control such that the rising speed Svinv (V/s) of the inverter terminal voltage Vinv is faster than the falling speed Svbat (V/s) of the battery voltage Vbat.

The step-down speed Svbat of the battery voltage Vbat depends on the required speed Spreq of the load 18 corresponding to a pedal press speed Vap (θ/s) of the accelerator pedal 114.

Figure 17:
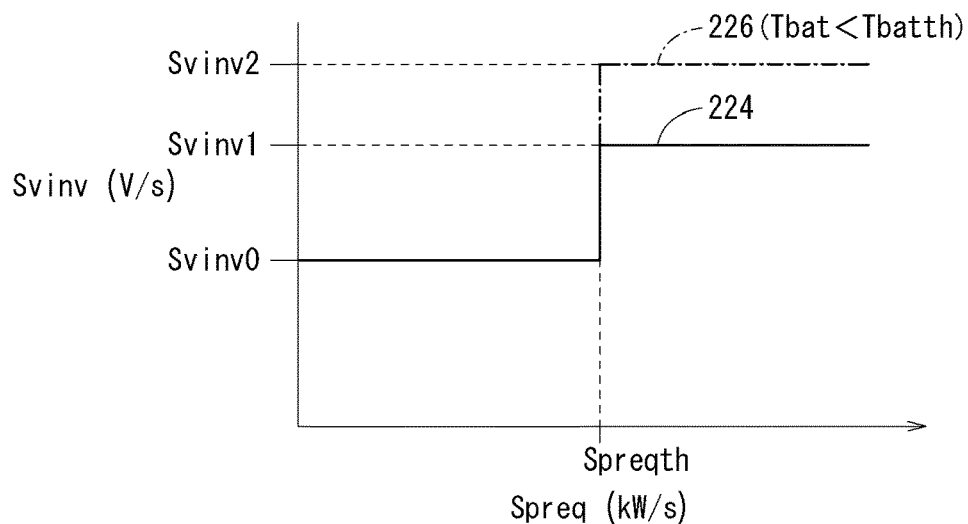
FIG. 17 is a graph of a characteristic of step-up speed of inverter terminal voltage to accompany explanation of a Modified Example 5.

Thus, as illustrated by a characteristic 224 in FIG. 17, in cases in which the required speed Spreq of the load 18 surpasses a threshold required speed Spreqth, the step-up speed Svinv (V/s) of the inverter terminal voltage Vinv is preferably increased from the step-up speed Svinv0 to the step-up speed Svinv1.

In cases in which the battery temperature Tbat is lower than a threshold value temperature Tbatth, for example, 0° C., the internal resistance of the battery 30 becomes larger, and so the step-up speed Svinv (V/s) of the inverter terminal voltage Vinv is preferably made larger than the step-up speed Svinv2.

Moreover, in the BAT converter 24, the inverter terminal voltage Vinv is normally controlled by feedforward control and feedback control, and so a greater amount of feedforward control may be employed to hasten the change in speed. Overshoot is increased by employing a larger amount of feedforward control, however, this is permissible.

Modified Example 6

Concerning Heater Core 124

As illustrated in FIG. 12, a heater core 124 is included in the configuration of an air conditioner in the auxiliary equipment 52. The heater core 124 is heated by hot water, heated by a hot water heater 126, being caused to flow through inside the heater core 124 by an electrical water pump (not illustrated in the drawings).

The hot water heater 126 is driven through a driving section 128 by the margin voltage setting/controlling section 51 at a duty ratio so that the water temperature Tw (° C.) achieves a specific temperature.

The driving section 128 is driven by the battery voltage Vbat, and a ripple voltage is generated in the battery voltage Vbat at the same frequency as the driving duty ratio, resulting in a ripple voltage Vrpl being generated in the inverter terminal voltage Vinv.

Figure 18:
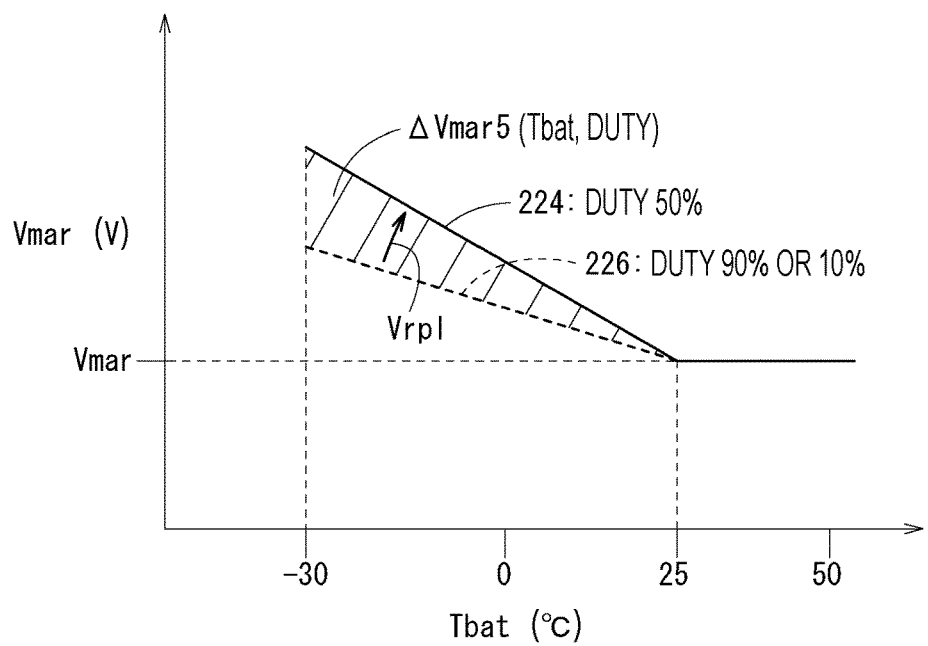
FIG. 18 is a graph of characteristics of increased margin voltage during heater operation to accompany explanation of a Modified Example 6.

As illustrated in FIG. 18, it is apparent that there is a relationship between the ripple voltage Vrpl generated in the inverter terminal voltage Vinv and the duty Dw of a PWM signal applied to the driving section 128 and to the battery temperature Tbat.

Namely, it is apparent that, as illustrated by a characteristic 224 (duty 50%) and a characteristic 226 (duty 90% or 10%), the ripple voltage Vrpl is larger the lower the battery temperature Tbat, and the closer the duty is to 50%.

There is accordingly a need to set the margin voltage Vmar in consideration of the ripple voltage Vrpl.

Namely, in cases in which there is a heater operation determination process to determine whether or not the heater core 124 is being operated (whether or not the driving section 128 is being driven), when determined that the heater core 124 is being operated, preferably, as appropriate, the margin voltage setting and control process K0 is implemented and a margin voltage ΔVmar5 (Tbat, duty) is added, as a variable that is a function of battery temperature Tbat and duty of the driving section 128. Vmar←Vmar+ΔVmar5

Note that the present disclosure is not limited to the embodiments described above, and obviously various configurations may be adopted based on the content of the present specification.

A control method of a power system according to the present disclosure is a control method for a fuel cell system including a fuel cell that generates a fuel cell voltage, an energy storage device that generates an energy storage device voltage, a motor, an inverter that drives the motor, an energy storage device side converter that is disposed between the energy storage device and the inverter and that switches between a directly connected state without voltage transforming and a voltage transforming state with voltage transforming between the energy storage device voltage and an inverter terminal voltage, and a fuel cell side converter that is disposed between the fuel cell and the inverter, and that steps up the fuel cell voltage to the inverter terminal voltage. The fuel cell system control method includes a margin voltage setting process in which a margin voltage is set to guarantee step-up operation or interruption of operation of the fuel cell side converter, and an inverter terminal voltage control process in which the energy storage device side converter is controlled to the directly connected state or to the voltage transforming state such that the inverter terminal voltage does not fall below a voltage of the margin voltage added to the fuel cell voltage.

According to the present disclosure, the energy storage device side converter is controlled to a directly connected state or a voltage transforming state so that the inverter terminal voltage does not fall below a voltage of the fuel cell voltage to which a margin voltage to guarantee step-up operation or interruption of operation of the fuel cell side converter has been added. This can thereby reliably avoid a state in which the fuel cell voltage becomes higher than the inverter terminal voltage, the fuel cell side converter enters a directly connected state, and the fuel cell voltage enters an uncontrollable state. As a result, this enables deterioration (a detrimental effect on the durability) of the fuel cell to be suppressed, while improving the fuel efficiency of the fuel cell.

The present disclosure accordingly enables both the controllability of the fuel cell system to be improved (a drop in controllability to be suppressed), and an improvement in the fuel efficiency.

In such cases, preferably, in the margin voltage setting process, a current passing through the energy storage device side converter is detected, and the margin voltage is set to a larger margin voltage in cases in which the detected passing current does not exceed a threshold current value close to zero at which direction of current flow changes.

By setting the margin voltage in this manner to a larger margin voltage in cases in which the current passing through the energy storage device side converter does not exceed a threshold current value close to zero at which direction of current flow changes and the controllability of the energy storage device side converter falls, the inverter terminal voltage on the low voltage side (the bottom peak side) can be reliably maintained higher than the fuel cell voltage even with a large fluctuation width in the inverter terminal voltage controlled by the energy storage device side converter. As a result, the controllability of the fuel cell can be maintained.

In the margin voltage setting process, preferably, a temperature or an internal resistance of the energy storage device is detected, and the margin voltage is set to a larger margin voltage in cases in which the detected temperature does not exceed a temperature threshold value, or in cases in which the detected internal resistance does not exceed an internal resistance threshold value.

Due to setting the margin voltage in this manner to a larger margin voltage in cases in which the temperature of the energy storage device does not exceed a temperature threshold value, or in other words, in cases in which internal resistance of the energy storage device does not exceed an internal resistance threshold value, the inverter terminal voltage on the low voltage side (the bottom peak side) can be reliably maintained higher than the fuel cell voltage even with a large fluctuation width in the inverter terminal voltage controlled by the energy storage device side converter (caused by an increase in the internal resistance of the energy storage device). As a result, the controllability of the fuel cell can be maintained.

In the margin voltage setting process, preferably, the margin voltage is set to a larger margin voltage in cases in which the fuel cell system is being started up and start up gas purging is being executed to externally expel gas remaining in the fuel cell system.

For example, it is conceivable that a fuel cell side converter having a function to step-up the fuel cell voltage enters a directly connected state when power is drawn from the energy storage device according to load requirement on start up, and the energy storage device voltage falls such that the fuel cell voltage is higher than the energy storage device voltage. In such cases, since there is already a low stoichiometric state inside the fuel cell, an even more serious gas deficient state arises, directly leading to deterioration of the electrolyte membrane.

In order to avoid such a situation arising, at start-up of the fuel cell system, in cases in which it is determined that gas purging is being executed with the accompanying possibility of the stoichiometric ratio of the fuel cell entering a low stoichiometric ratio state, the margin voltage is set to a larger margin voltage, thereby enabling an unintentional directly connected state of the fuel cell side converter to be reliably avoided, such the fuel cell (the fuel cell voltage) can be reliably controlled.

Moreover, in the margin voltage setting process, preferably, determination is made as to whether or not power of the fuel cell in the fuel cell system needs to be forcefully interrupted, and, in cases in which determination is made that forcefully interruption is needed, the margin voltage is set such that a difference voltage of a fuel cell open circuit voltage subtracted from inverter terminal voltage is a positive value during execution of the margin voltage setting process to guarantee the interruption of operation of the fuel cell side converter.

Thus by setting the margin voltage in this manner such that the difference voltage obtained by subtracting the fuel cell open circuit voltage from inverter terminal voltage is a positive value (the fuel cell open circuit voltage<inverter terminal voltage) when it has been determined that there is a need to forcefully restrict power of the fuel cell in the fuel cell system, the fuel cell enters an interrupted state, operation of the fuel cell side converter is reliably interrupted even if the fuel cell voltage is stepped up to the fuel cell open circuit voltage, and power to the fuel cell is interrupted.

Moreover, preferably, in cases in which the fuel cell system is installed to a vehicle and a load is the motor, when an acceleration required of the vehicle is an acceleration exceeding a threshold acceleration, in the inverter terminal voltage control process, in cases in which the inverter terminal voltage is stepped up to a voltage of the margin voltage added to the fuel cell voltage by the fuel cell side converter, voltage step-up is performed at a step-up speed faster than a normal step-up speed.

Making the step-up speed of the inverter terminal voltage faster in this manner in cases in which there is a large acceleration required of a vehicle, suppresses the amount by which the bottom voltage of the inverter terminal voltage falls due to the battery voltage falling, and enables the bottom voltage of the inverter terminal voltage to be prevented from falling below the fuel cell voltage.

Moreover, preferably, the margin voltage setting process includes a heater operation determination process that determines whether or not a heater is being operated, and, in the margin voltage setting process, the margin voltage is set to a larger margin voltage in cases in which the heater is determined to be in operation.

By making the margin voltage larger in this manner in cases in which it is anticipated that the inverter terminal voltage will fall by a large amount accompanying operation of the heater, the inverter terminal voltage is prevented from falling below the fuel cell voltage.

The present disclosure also encompasses a fuel cell vehicle in which the motor is a traction motor.

According to the present disclosure, the energy storage device side converter is controlled to a directly connected state or a voltage transforming state such that the inverter terminal voltage does not fall below a voltage obtained by adding a margin voltage to guarantee step-up operation or interruption of operation of the fuel cell side converter to the fuel cell voltage. This can avoid a state in which the fuel cell voltage becomes higher than the inverter terminal voltage, the fuel cell side converter enters a directly connected state, and the fuel cell voltage enters an uncontrollable state. As a result this enables deterioration (a detrimental effect on the durability) of the fuel cell to be suppressed while improving the fuel efficiency of the fuel cell.

Obviously, numerous modifications and variations of the present invention are possible in light of the above teachings. It is therefore to be understood that within the scope of the appended claims, the invention may be practiced otherwise than as specifically described herein.

What is claimed is:

1. A control method for a fuel cell system, comprising:
controlling an inverter to transform a fuel cell voltage generated by a fuel cell and an energy storage device voltage generated by an energy storage device to supply power to a motor;
controlling a fuel cell side converter that is provided between the fuel cell and the inverter to step up the fuel cell voltage to an inverter terminal voltage supplied to the inverter;
setting a margin voltage to a first margin voltage to guarantee operation of the fuel cell side converter;
controlling an energy storage device side converter provided between the energy storage device and the inverter to operate in a directly connected state in which the energy storage device side converter does not transform the energy storage device voltage such that a difference voltage between the energy storage device voltage and the fuel cell voltage is higher than the first margin voltage; and
setting the margin voltage to a second margin voltage larger than the first margin voltage to control the energy storage device side converter to operate in a voltage transforming state in which the energy storage device side converter transforms the energy storage device voltage to the inverter terminal voltage such that the difference voltage is higher than the second margin voltage, when the difference voltage reaches the first margin voltage.

2. The fuel cell system control method according to claim 1, further comprising:
detecting a current passing through the energy storage device side converter, wherein the margin voltage is set to a third margin voltage larger than the first margin voltage in cases in which the detected passing current does not exceed a threshold current value close to zero at which direction of current flow changes.

3. The fuel cell system control method according to claim 1, further comprising:
detecting a temperature or an internal resistance of the energy storage device, wherein the margin voltage is set to a fourth margin voltage larger than the first margin voltage in cases in which the detected temperature does not exceed a temperature threshold value, or in cases in which the detected internal resistance does not exceed an internal resistance threshold value.

4. The fuel cell system control method according to claim 1, wherein:
the margin voltage is set to a fifth margin voltage larger than the first margin voltage in cases in which the fuel cell system is being started up and start up gas purging is being executed to externally expel gas remaining in the fuel cell system.

5. The fuel cell system control method according to claim 1, further comprising:
determining as to whether or not power of the fuel cell in the fuel cell system needs to be forcefully interrupted, wherein in cases in which it is determined that forcefully interruption is needed, the margin voltage is set such that a difference voltage of a fuel cell open circuit voltage subtracted from inverter terminal voltage is a positive value to guarantee the interruption of operation of the fuel cell side converter.

6. The fuel cell system control method according to claim 1, wherein:
in cases in which fuel cell system is installed to a vehicle and a load is the motor, when an acceleration required of the vehicle is an acceleration exceeding a threshold acceleration, and
in cases in which the inverter terminal voltage is a sum of the margin voltage and the fuel cell voltage, the fuel cell side converter steps up the fuel cell voltage to the inverter terminal voltage at a step-up speed faster than a normal step-up speed.

7. The fuel cell system control method according to claim 1, further comprising:
determining whether or not a heater is being operated, wherein the margin voltage is set to a sixth margin voltage larger than the first margin voltage in cases in which the heater is determined to be in operation.

8. A fuel cell vehicle executing the method according to claim 1, wherein the motor is a traction motor.

9. A fuel cell vehicle executing the method according to claim 2, wherein the motor is a traction motor.

10. A fuel cell vehicle executing the method according to claim 3, wherein the motor is a traction motor.

11. A fuel cell vehicle executing the method according to claim 4, wherein the motor is a traction motor.

12. A fuel cell vehicle executing the method according to claim 5, wherein the motor is a traction motor.

13. A fuel cell vehicle executing the method according to claim 6, wherein the motor is a traction motor.

14. A fuel cell vehicle executing the method according to claim 7, wherein the motor is a traction motor.

15. A control method for a fuel cell system, comprising:
controlling an inverter to transform a fuel cell voltage generated by a fuel cell and an energy storage device voltage generated by an energy storage device to supply power to a motor;
controlling a fuel cell side converter that is provided between the fuel cell and the inverter to step up the fuel cell voltage to an inverter terminal voltage supplied to the inverter;
setting a margin voltage to guarantee step-up operation or interruption of operation of the fuel cell side converter;
selecting a directly connected state or a voltage transforming state regarding an operation state of an energy storage device side converter that is provided between the energy storage device and the inverter such that the inverter terminal voltage is higher than a sum of the margin voltage and the fuel cell voltage, the energy storage device side converter not transforming the energy storage device voltage in the directly connected state, the energy storage device side converter transforming the energy storage device voltage to the inverter terminal voltage in the voltage transforming state; and
detecting a current passing through the energy storage device side converter,
wherein the margin voltage is set to a larger margin voltage in cases in which the detected passing current does not exceed a threshold current value close to zero at which direction of current flow changes.

16. A control method for a fuel cell system, comprising:
controlling an inverter to transform a fuel cell voltage generated by a fuel cell and an energy storage device voltage generated by an energy storage device to supply power to a motor;

detecting a temperature or an internal resistance of the energy storage device;
controlling a fuel cell side converter that is provided between the fuel cell and the inverter to step up the fuel cell voltage to an inverter terminal voltage supplied to the inverter;
setting a margin voltage to guarantee step-up operation or interruption of operation of the fuel cell side converter; and
selecting a directly connected state or a voltage transforming state regarding an operation state of an energy storage device side converter that is provided between the energy storage device and the inverter such that the inverter terminal voltage is higher than a sum of the margin voltage and the fuel cell voltage, the energy storage device side converter not transforming the energy storage device voltage in the directly connected state, the energy storage device side converter transforming the energy storage device voltage to the inverter terminal voltage in the voltage transforming state,
wherein the margin voltage is set to a larger margin voltage in cases in which the detected temperature does not exceed a temperature threshold value, or in cases in which the detected internal resistance does not exceed an internal resistance threshold value.

17. A control method for a fuel cell system, comprising:
controlling an inverter to transform a fuel cell voltage generated by a fuel cell and an energy storage device voltage generated by an energy storage device to supply power to a motor;
controlling a fuel cell side converter that is provided between the fuel cell and the inverter to step up the fuel cell voltage to an inverter terminal voltage supplied to the inverter;
setting a margin voltage to guarantee step-up operation or interruption of operation of the fuel cell side converter; and
selecting a directly connected state or a voltage transforming state regarding an operation state of an energy storage device side converter that is provided between the energy storage device and the inverter such that the inverter terminal voltage is higher than a sum of the margin voltage and the fuel cell voltage, the energy storage device side converter not transforming the energy storage device voltage in the directly connected state, the energy storage device side converter transforming the energy storage device voltage to the inverter terminal voltage in the voltage transforming state,
wherein the margin voltage is set to a larger margin voltage in cases in which the fuel cell system is being started up and start up gas purging is being executed to externally expel gas remaining in the fuel cell system.

18. A control method for a fuel cell system, comprising:
controlling an inverter to transform a fuel cell voltage generated by a fuel cell and an energy storage device voltage generated by an energy storage device to supply power to a motor;
controlling a fuel cell side converter that is provided between the fuel cell and the inverter to step up the fuel cell voltage to an inverter terminal voltage supplied to the inverter;
determining as to whether or not power of the fuel cell in the fuel cell system needs to be forcefully interrupted;
setting a margin voltage to guarantee step-up operation or interruption of operation of the fuel cell side converter; and
selecting a directly connected state or a voltage transforming state regarding an operation state of an energy storage device side converter that is provided between the energy storage device and the inverter such that the inverter terminal voltage is higher than a sum of the margin voltage and the fuel cell voltage, the energy storage device side converter not transforming the energy storage device voltage in the directly connected state, the energy storage device side converter transforming the energy storage device voltage to the inverter terminal voltage in the voltage transforming state,
wherein in cases in which it is determined that forcefully interruption is needed, the margin voltage is set such that a difference voltage of a fuel cell open circuit voltage subtracted from inverter terminal voltage is a positive value to guarantee the interruption of operation of the fuel cell side converter.

19. A control method for a fuel cell system, comprising:
controlling an inverter to transform a fuel cell voltage generated by a fuel cell and an energy storage device voltage generated by an energy storage device to supply power to a motor;
controlling a fuel cell side converter that is provided between the fuel cell and the inverter to step up the fuel cell voltage to an inverter terminal voltage supplied to the inverter;
setting a margin voltage to guarantee step-up operation or interruption of operation of the fuel cell side converter; and
selecting a directly connected state or a voltage transforming state regarding an operation state of an energy storage device side converter that is provided between the energy storage device and the inverter such that the inverter terminal voltage is higher than a sum of the margin voltage and the fuel cell voltage, the energy storage device side converter not transforming the energy storage device voltage in the directly connected state, the energy storage device side converter transforming the energy storage device voltage to the inverter terminal voltage in the voltage transforming state, wherein:
in cases in which fuel cell system is installed to a vehicle and a load is the motor, when an acceleration required of the vehicle is an acceleration exceeding a threshold acceleration; and
in cases in which the inverter terminal voltage is a sum of the margin voltage and the fuel cell voltage, the fuel cell side converter steps up the fuel cell voltage to the inverter terminal voltage at a step-up speed faster than a normal step-up speed.

20. A control method for a fuel cell system, comprising:
controlling an inverter to transform a fuel cell voltage generated by a fuel cell and an energy storage device voltage generated by an energy storage device to supply power to a motor;
controlling a fuel cell side converter that is provided between the fuel cell and the inverter to step up the fuel cell voltage to an inverter terminal voltage supplied to the inverter;
determining whether or not a heater is being operated;
setting a margin voltage to guarantee step-up operation or interruption of operation of the fuel cell side converter; and selecting a directly connected state or a voltage transforming state regarding an operation state of an energy storage device side converter that is provided between the energy storage device and the inverter such that the inverter terminal voltage is higher than a sum of the margin voltage and the fuel cell voltage, the energy storage device side converter not transforming the energy storage device voltage in the directly connected state, the energy storage device side converter transforming the energy storage device voltage to the inverter terminal voltage in the voltage transforming state, wherein the margin voltage is set to a larger margin voltage in cases in which the heater is determined to be in operation.

* * * * *